United States Patent
Sriram et al.

(10) Patent No.: US 12,432,614 B2
(45) Date of Patent: Sep. 30, 2025

(54) TECHNIQUES ABOUT CONVERTING TIME-DOMAIN FRONTHAUL DATA TO FREQUENCY-DOMAIN FRONTHAUL DATA WITHIN A DISTRIBUTED ANTENNA SYSTEM

(71) Applicant: Outdoor Wireless Networks LLC, Claremont, NC (US)

(72) Inventors: Suresh N. Sriram, Bangalore (IN); Sudarshana Varadappa, Bangalore (IN); Narayana Reddy Korimilla, Bangalore (IN); Emil Mathew Kadavil, Bangalore (IN); Syamala Saripalli, Bangalore (IN); Yogesh C. S, Bengaluru (IN)

(73) Assignee: Outdoor Wireless Networks LLC, Richardson, TX (US)

(*) Notice: Subject to any disclaimer, the term of this patent is extended or adjusted under 35 U.S.C. 154(b) by 0 days.

(21) Appl. No.: 18/873,000

(22) PCT Filed: May 19, 2023

(86) PCT No.: PCT/US2023/022960
§ 371 (c)(1),
(2) Date: Dec. 9, 2024

(87) PCT Pub. No.: WO2023/239544
PCT Pub. Date: Dec. 14, 2023

(65) Prior Publication Data
US 2025/0267508 A1 Aug. 21, 2025

Related U.S. Application Data

(60) Provisional application No. 63/478,424, filed on Jan. 4, 2023, provisional application No. 63/383,159, filed on Nov. 10, 2022.

(30) Foreign Application Priority Data

Jun. 9, 2022 (IN) .............................. 202241032981
Jul. 16, 2022 (IN) .............................. 202241040806

(51) Int. Cl.
*H04W 28/06* (2009.01)
*H04W 72/044* (2023.01)
*H04W 88/08* (2009.01)

(52) U.S. Cl.
CPC ......... *H04W 28/06* (2013.01); *H04W 72/044* (2013.01); *H04W 88/085* (2013.01)

(58) Field of Classification Search
CPC ........... H04W 88/085; H04W 72/0453; H04W 72/54; H04W 88/16; H04W 72/046;
(Continued)

(56) References Cited

U.S. PATENT DOCUMENTS

2017/0280405 A1* 9/2017 Feng .................. H04J 14/0204
2017/0373890 A1* 12/2017 Fertonani ................ H04L 25/02
(Continued)

FOREIGN PATENT DOCUMENTS

| CN | 109412720 A * | 3/2019 | ........... H04B 17/345 |
| WO | WO-2011104951 A1 * | 9/2011 | ........... H04J 11/0023 |
| WO | 2023239544 A1 | 12/2023 | |

OTHER PUBLICATIONS

International Searching Authority, "International Search Report and Written Opinion", dated Sep. 20, 2023, from PCT Application No. PCT/US2023/022960, pp. 1 through 13, Published: WO.

*Primary Examiner* — Dung Hong
(74) *Attorney, Agent, or Firm* — Fogg & Powers LLC

(57) ABSTRACT

Techniques for reducing downlink data and/or uplink data transported in a distributed antenna system (DAS) are provided. Time domain data is transformed into a frequency domain. In the DAS, on a PRB-by-PRB basis, whether each of frequency-domain downlink digital data and frequency-domain uplink digital data comprise a meaningful signal is determined. Each of the frequency-domain downlink digital data and the frequency-domain uplink digital data comprising valid PRBs are subsequently transported in the DAS. Other techniques are disclosed for utilizing O-RAN user plane messages and corresponding O-RAN control plane messages in fronthaul transport of a distributed antenna system (DAS) to reduce bandwidth consumption and simplify management of the DAS. Bandwidth consumption in
(Continued)

the fronthaul transport of the DAS is diminished by only transporting IQ data having a valid signal.

18 Claims, 9 Drawing Sheets

(58) Field of Classification Search
CPC . H04W 72/1263; H04W 72/12; H04W 24/02; H04W 72/0446; H04W 28/06; H04W 72/044

See application file for complete search history.

(56) References Cited

U.S. PATENT DOCUMENTS

| | | | |
|---|---|---|---|
| 2018/0263055 A1* | 9/2018 | Hazani | H04W 74/085 |
| 2018/0302210 A1* | 10/2018 | Hedin | H04L 5/1469 |
| 2019/0372530 A1* | 12/2019 | Stewart | H04B 1/525 |
| 2021/0105774 A1* | 4/2021 | Oh | H04W 72/0453 |
| 2022/0038126 A1* | 2/2022 | Kummetz | H04B 1/18 |
| 2022/0417876 A1* | 12/2022 | Ranson | H04B 7/022 |

* cited by examiner

TECHNIQUES ABOUT CONVERTING TIME-DOMAIN FRONTHAUL DATA TO FREQUENCY-DOMAIN FRONTHAUL DATA WITHIN A DISTRIBUTED ANTENNA SYSTEM

CROSS-REFERENCE TO RELATED APPLICATIONS

The present application is a 371 National Stage Application of International Application No. PCT/US2023/022960, filed on May 19, 2023, which claims benefit of U.S. Patent Application Ser. No. 63/383,159 filed Nov. 10, 2022, and U.S. Patent Application Ser. No. 63/478,424 filed Jan. 4, 2023; the entire contents of each of the aforementioned patent applications are incorporated herein by reference as if set forth in its entirety. The present application claims priority to Indian Patent Application Serial No. 202241032981 filed on Jun. 9, 2022, and Indian Patent Application No. 202241040806 filed on Jul. 16, 2022; the entire contents of each of the aforementioned patent applications are incorporated herein by reference as if set forth in its entirety.

BACKGROUND

A distributed antenna system (DAS) typically includes one or more central units or nodes (also referred to here as "central access nodes (CANs)" or "master units") that are communicatively coupled to a plurality of remotely located access points or antenna units (also referred to here as "remote units"), where each access point can be coupled directly to one or more of the central access nodes or indirectly via one or more other remote units and/or via one or more intermediary or expansion units or nodes (also referred to here as "transport expansion nodes (TENs)"). A DAS is typically used to improve the coverage provided by one or more base stations that are coupled to the central access nodes. These base stations can be coupled to the one or more central access nodes via one or more cables or via a wireless connection, for example, using one or more donor antennas. The wireless service provided by the base stations can include commercial cellular service and/or private or public safety wireless communications.

In general, each central access node receives one or more downlink signals from one or more base stations and generates one or more downlink transport signals derived from one or more of the received downlink base station signals. Each central access node transmits one or more downlink transport signals to one or more of the access points. Each access point receives the downlink transport signals transmitted to it from one or more central access nodes and uses the received downlink transport signals to generate one or more downlink radio frequency signals that are radiated from one or more coverage antennas associated with that access point. The downlink radio frequency signals are radiated for reception by user equipment (UEs). Typically, the downlink radio frequency signals associated with each base station are simulcasted from multiple remote units. In this way, the DAS increases the coverage area for the downlink capacity provided by the base stations.

Likewise, each access point receives one or more uplink radio frequency signals transmitted from the user equipment. Each access point generates one or more uplink transport signals derived from the one or more uplink radio frequency signals and transmits them to one or more of the central access nodes. Each central access node receives the respective uplink transport signals transmitted to it from one or more access points and uses the received uplink transport signals to generate one or more uplink base station radio frequency signals that are provided to the one or more base stations associated with that central access node. Typically, this involves, among other things, summing uplink signals received from all of the multiple access points in order to produce the base station signal provided to each base station. In this way, the DAS increases the coverage area for the uplink capacity provided by the base stations.

A DAS can use either digital transport, analog transport, or combinations of digital and analog transport for generating and communicating the transport signals between the central access nodes, the access points, and any transport expansion nodes.

Traditionally, a DAS is operated in a "full simulcast" mode in which downlink signals for each base station are transmitted from multiple access points of the DAS and in which uplink signals for each base station are generated by summing uplink data received from all of the multiple access points. That is, each uplink signal provided to each base station is typically generated by summing uplink data received using all of the multiple access points, even though it is typically the case that for each UE served by the DAS only a few access points of the DAS will typically contribute any meaningful "signal" for that UE and the other access points will typically contribute mostly "noise" for that UE and/or typically contribute mostly "interference" for that UE. Because the number of access points contributing mostly "noise" or "interference" is typically much larger than the number of access points contributing any meaningful "signal," summing uplink data received using all of the access points typically increases the noise floor in the resulting uplink signal generated for the base station and may reduce the overall signal-to-interference-and-noise ratio (SINR) for the resulting uplink signal.

Moreover, traditionally, the downlink transport signals communicated to the various access points is communicated as a time-domain digital data for the entire bandwidth of interest. This is bandwidth intensive since it results in downlink digital data being communicated for all physical resource blocks (PRBs) even if some of the PRBs are not being used to wirelessly transmit data over the air to user equipment (UE).

Further, when digital transport has traditionally been used in a DAS, the various nodes of a DAS have been coupled to each other using synchronous, point-to-point links and data has been transported in a time-domain form. The time-domain form of such data is also referred to here as using "option 8" for the functional split (for example, between a baseband unit (BBU) and remote radio head (RRH)) or simply "split 8." Approaches used with such split 8 implementations may have shortcomings when used in a DAS where the nodes are coupled to each other in other ways (for example, using a switched Ethernet network). Moreover, the O-RAN Alliance has developed an open, standardized fronthaul interface that is suitable for use in implementing distributed base station topologies using switched Ethernet networks as the fronthaul. ("O-RAN" is an acronym for "Open Radio Access Network.") The O-RAN fronthaul interface was designed primarily for use with user-plane data that is communicated in frequency-domain form. Communicating user-plane data in frequency-domain form reduces the amount of bandwidth used (relative to communicating data in time-domain form). The O-RAN fronthaul interface does support communicating data in time-domain form; however, doing so is bandwidth intensive.

When a DAS transports both non-O-RAN compliant, time-domain digital data and data in an O-RAN compliant packet format, different techniques are required to manage the different types of data, e.g., to mute unused uplink channels. This undesirably increases DAS complexity and cost. Further, conveying time-domain data consumes significantly more bandwidth.

SUMMARY

A distributed antenna system (DAS), comprising: one of (a) a radio frequency (RF) donor configured to be communicatively coupled to a downlink antenna port of an RF interface base station, and (b) a digital donor configured to be communicatively coupled to a downlink antenna port of a baseband unit; a master timing entity configured to be synchronized with a time base of the RF interface base station or the baseband unit, and to provide a synchronized time base to components of the DAS used to determine slot related timing; and a plurality of remote units each of which is communicatively coupled to one of (a) the RF donor and (b) the digital donor, and each remote unit in a simulcast zone of the RF interface base station or the baseband unit is configured to (i) receive, for a slot, frequency-domain downlink baseband IQ data including only valid physical resource blocks (PRBs) which includes (p) control-plane data which identifies PRBs of the slot which contain valid PRBs and (q) corresponding user-plane data which contains baseband IQ data for the valid PRBs of the slot, (ii) using the frequency-domain downlink baseband IQ data including only the valid PRBs, generate downlink analog RF signals including only valid PRBs, and (iii) wirelessly transmit the downlink analog RF signals including only the valid PRBs; wherein DAS is configured to: receive a downlink base station signal or a stream of time-domain downlink baseband IQ data for the downlink antenna port of the RF interface base station or the baseband unit; using the downlink base station signal or the stream of the time-domain downlink baseband IQ data, generate time-domain downlink baseband IQ data for the downlink antenna port for the slot; using the time-domain downlink baseband IQ data for the slot, generate, for the slot, the frequency-domain downlink baseband IQ data; using the frequency-domain downlink baseband IQ data, for the slot, identify the valid PRBs and generate the control-plane data which identifies PRBs of the slot which contain the valid PRBs and the corresponding user-plane data which contain downlink baseband IQ data for the valid PRBs; and transmit frequency-domain downlink baseband IQ data for only the valid PRBs, including the control-plane data and the corresponding user-plane data, to each remote unit in the simulcast zone.

A method of reducing downlink data transported in a distributed antenna system (DAS), the method comprising: receiving a downlink base station signal or a stream of time-domain downlink baseband IQ data for a downlink antenna port of a radio frequency (RF) interface base station or a baseband unit; using the downlink base station signal or the stream of time-domain downlink baseband IQ data, generating time-domain downlink baseband IQ data for the downlink antenna port for a slot; using the time-domain downlink baseband IQ data, generating, for a slot, frequency-domain downlink baseband IQ data; using the frequency-domain downlink baseband IQ data, of the slot, identifying valid physical resource blocks (PRBs) and generating control-plane data which identifies PRBs of the slot which contain the valid PRBs and a corresponding user-plane data which contain baseband IQ data for the valid PRBs; transmitting frequency-domain baseband IQ data for only the valid PRBs, including the control-plane data and the corresponding user-plane data, to each remote unit of the DAS in a simulcast zone of the RF interface base station or the baseband unit; using the frequency-domain downlink baseband IQ data including only the valid PRBs, generating, in each remote unit of the DAS in the simulcast zone, downlink analog RF signals including only the valid PRBs; and wirelessly transmitting, from each remote unit of the DAS in the simulcast zone, the downlink analog RF signals including only the valid PRBs.

A distributed antenna system (DAS) serving a base station, the distributed antenna system comprising: one of: (a) a radio frequency (RF) donor configured to be communicatively coupled to an uplink antenna port of an RF interface base station, and (b) a digital donor configured to be communicatively coupled to an uplink antenna port of a baseband unit; a master timing entity configured be synchronized with a time base of the one of: (a) the RF interface base station and (b) the baseband unit, and to provide a synchronized time base to components of the DAS used to determine slot related timing; and a plurality of remote units each of which is (x) communicatively coupled to each of the one of: (a) the RF donor and (b) the digital donor, wherein each remote unit in a simulcast zone of the RF interface base station or the baseband unit is configured to: wirelessly receive uplink analog RF signals for the uplink antenna port of the RF interface base station or the baseband unit; using the uplink analog RF signals, generate time-domain uplink baseband IQ data for a slot; using the time-domain uplink baseband IQ data for the slot, generate, for the slot, frequency-domain uplink baseband IQ data; using the frequency-domain uplink baseband IQ data for the slot, identify valid physical resource blocks (PRBs) and generate control-plane data which identifies PRBs of the slot which contain valid PRBs and corresponding user-plane data which contain uplink baseband IQ data for the valid PRBs; transmit frequency-domain uplink baseband IQ data for only the valid PRBs including the control-plane data and the corresponding user-plane data; wherein the DAS is configured to: receive the frequency-domain uplink baseband IQ data for only the valid PRBs including the control-plane data and the corresponding user-plane data; using the frequency-domain uplink baseband IQ data for only the valid PRBs, generate single combined base station signal or a stream of the uplink time-domain baseband IQ data; and transmit the single combined base station signal or the stream of the uplink time-domain uplink baseband IQ data to the uplink antenna port of the RF interface base station or the baseband unit.

A method of reducing uplink data transported in a distributed antenna system (DAS), the method comprising: wirelessly receiving, at each remote unit of the DAS in a simulcast zone of a radio frequency (RF) interface base station or a baseband unit, uplink analog RF signals for an uplink antenna port of an RF interface base station or a base band unit; using the uplink analog RF signals, generating time-domain uplink baseband IQ data for a slot; using the time-domain uplink baseband IQ data for the slot, generate, for the slot, frequency-domain uplink baseband IQ data; using the frequency-domain uplink baseband IQ data for the slot, identifying valid physical resource blocks (PRBs) and generating control-plane data which identifies PRBs of the slot which contain the valid PRBs and corresponding user-plane data which contain uplink baseband IQ data for the valid PRBs; transmitting the frequency-domain uplink baseband IQ data for only the valid PRBs, including the control-plane data and the corresponding user-plane data, to another component of the DAS; using the frequency-domain uplink baseband IQ data for only the valid PRBs, generating a single combined base station uplink signal stream or a stream of the time-domain uplink baseband IQ data; and transmitting the single combined base station uplink signal stream or the stream of the time-domain uplink baseband IQ data to the uplink antenna port of the RF interface base station or the baseband unit.

A distributed antenna system (DAS) serving a donor base station, the distributed antenna system comprising: a donor interface circuit configured to couple the donor base station to the DAS and to communicate analog radio frequency (RF) signals or time-domain digital data between the donor base station and the donor interface circuit; and a plurality of radio units (RUs) coupled to the donor interface circuit through an Ethernet network; wherein the DAS is configured to: receive downlink RF analog signals or downlink time-domain digital data including downlink in-phase and quadrature phase (IQ) data from a donor base station at the donor interface circuit, and therefrom produce the downlink time-domain digital data including the downlink IQ data at baseband; convert downlink time-domain baseband digital data into downlink frequency-domain baseband digital data including the downlink IQ data; identify downlink physical resource blocks (PRBs), for each slot of the downlink frequency-domain baseband digital data, having a valid signal and which include downlink IQ data from the donor base station, wherein the valid signal means a PRB or portion thereof satisfies predetermined one or more criterion; create, for each slot, at least one downlink open radio access network (O-RAN) user-plane message, comprising frequency-domain baseband IQ data including only the downlink PRBs of a slot having a valid received signal and including the downlink IQ data, and at least one corresponding downlink O-RAN control-plane message; and transmit, for each slot, the at least one downlink O-RAN user-plane message, comprising the frequency-domain baseband IQ data, and the at least one corresponding downlink O-RAN control-plane message; wherein each RU, of at least one RU, in a simulcast zone of the donor base station is configured to: receive the at least one downlink O-RAN user-plane message comprising downlink IQ data generated by the donor base station and the at least one corresponding downlink O-RAN control-plane message; using received O-RAN downlink user- and control-plane messages, produce a set of downlink RF analog signals including the downlink IQ data; and wirelessly transmit, to one or more user equipment, the set of downlink RF analog signals including the downlink IQ data.

A method for translating time-domain data into open radio access network (O-RAN) messages in a distributed antenna system (DAS), the method comprising: receiving downlink RF analog signals or downlink time-domain digital data including downlink in-phase and quadrature phase (IQ) data from a donor base station, and therefrom produce the downlink time-domain digital data; converting the downlink time-domain digital data into downlink frequency-domain data; identifying downlink physical resource blocks (PRBs) for each slot having a valid signal and which include downlink IQ data from the donor base station, wherein the valid signal means a PRB or portion thereof satisfies predetermined one or more criterion; creating, for each slot, at least one downlink open radio access network (O-RAN) user-plane message, comprising frequency-domain baseband IQ data including only the downlink PRBs of a slot having a valid received signal and including the downlink IQ data, and at least one corresponding downlink O-RAN control-plane message; transmitting, for each slot, the at least one downlink O-RAN user-plane message, comprising the frequency-domain baseband IQ data, and the at least one corresponding downlink O-RAN control-plane message; receiving at each radio unit (RU) in a simulcast zone of the donor base station the at least one downlink O-RAN user-plane message comprising downlink IQ data generated by the donor base station and the at least corresponding one downlink O-RAN control-plane message; using received downlink O-RAN user- and control-plane messages, producing, at each RU in the simulcast zone of the donor base station, a set of downlink RF analog signals including the downlink IQ data; and wirelessly transmitting, from each RU in the simulcast zone of the donor base station and to one or more user equipment, the set of downlink RF analog signals including the downlink IQ data.

A distributed antenna system (DAS) serving a donor base station, the distributed antenna system comprising: a donor interface circuit configured to couple the donor base station to the DAS and to communicate analog radio frequency (RF) signals or time-domain digital data between the donor base station and the donor interface circuit; and a plurality of radio units (RUs) coupled to the donor interface circuit through an Ethernet network; wherein each RU, of at least one RU, in a simulcast zone of the donor base station is configured to: wirelessly receive, from one or more user equipment, a set of uplink RF analog signals including uplink in-phase and quadrature phase (IQ) data; using the set of uplink RF analog signals including the uplink IQ data, generate uplink frequency-domain IQ data at baseband; identify uplink physical resource blocks (PRBs) having a valid signal and which include the uplink IQ data from the one or more user equipment; and create and then transmit, towards the donor interface circuit, at least one O-RAN uplink user-plane message including only uplink PRBs for each slot having a valid received signal and including the uplink IQ data and at least one corresponding O-RAN uplink control-plane message; wherein the DAS is configured to: receive the at least one O-RAN uplink user-plane message comprising uplink IQ data and the at least one corresponding O-RAN uplink control-plane message; using the received messages, generate at least one combined uplink O-RAN user-plane message for each slot; determine whether a component of the DAS, combining uplink O-RAN user-plane messages for each slot, is a last component, of the DAS in a path to the donor interface circuit, performing combining of uplink user-plane messages; determining that the component of the DAS performing the combining is the last component performing combining of uplink user-plane messages, then, convert, for each slot, combined frequency-domain IQ data into combined time-domain IQ data; using the combined time-domain IQ data, produce a single set of uplink time-domain base station signals or data; and transmit the signals or data including the combined uplink time-domain IQ data to a donor base station.

A method for translating open radio access network (O-RAN) messages into time-domain data in a distributed antenna system (DAS), the method comprising: wirelessly receiving, from one or more user equipment, a set of uplink RF analog signals including uplink in-phase and quadrature phase (IQ) data; using the set of uplink RF analog signals including the uplink IQ data, generating uplink frequency-domain IQ data at baseband; identifying uplink physical resource blocks (PRBs) having a valid signal and which include the uplink IQ data from the one or more user equipment; creating and then transmitting, towards a donor interface circuit, at least one O-RAN uplink user-plane message including only uplink PRBs for each slot having a valid received signal and including the uplink IQ data and at least one corresponding O-RAN uplink control-plane message; receiving the at least one O-RAN uplink user-plane message comprising uplink IQ data and the at least one corresponding O-RAN uplink control-plane message; using received messages, generating at least one combined uplink user-plane message for each slot; determining whether a component of the DAS, combining uplink O-RAN user-plane messages for each slot, is a last component, of the DAS in a path to the donor interface circuit, performing combining of uplink user-plane messages; determining that the component of the DAS performing the combining is the last component performing combining of uplink user-plane messages, then, converting, for each slot, combined uplink frequency-domain IQ data into combined uplink time-domain IQ data; and transmitting signals or data including the combined uplink time-domain IQ data to a donor base station.

BRIEF DESCRIPTION OF THE DRAWINGS

Comprehension of embodiments of the invention is facilitated by reading the following detailed description in conjunction with the annexed drawings, in which.

DETAILED DESCRIPTION

Embodiments of the invention are configured to improve DAS fronthaul transport bandwidth for base stations that interface with the DAS using time-domain signals. Examples of such base stations comprise RF-interface base stations and CPRI BBUs.

In such an embodiment, instead of transporting time-domain digital for all PRBs regardless of whether the PRBs are "valid" or "invalid," the transport data is selectively pruned or muted so that only fronthaul data for "valid" PRBs are transported over the DAS. This technique can be performed in the downlink (DL) and/or the uplink (UL). Fronthaul bandwidth constraints in the downlink and uplink may be addressed by only transporting valid PRBs.

As used here, a "valid" PRB is one that is conveying sufficient "signal" (where "signal" is used as it is used in the concept of a signal-to-interference-plus-noise ratio (SINR)) to satisfy a predetermined criteria, whereas an "invalid" PRB is one that is not conveying sufficient "signal" ((where "signal" is defined as used in the context of a signal-to-interference-plus-noise ratio (SINR)) to satisfy the predetermined criteria (for example, because the PRB is "empty" or conveys predominately "interference" and/or "noise").

In one embodiment, the time domain IQ data is converted into frequency domain data (for example, using a fast Fourier transform (FFT), digital down conversion, etc.), valid PRBs are identified, and only valid PRBs are communicated over the DAS.

Other embodiments of the invention include DASs configured to communicate with O-RAN compliant distributed unit(s), and base station(s) which are not O-RAN compliant. Embodiments of the invention include DASs which convert between time-domain digital data, which is not O-RAN compliant, and frequency-domain digital data in an O-RAN compliant packet format so that only the frequency-domain digital data in the O-RAN compliant packet format is transported in a fronthaul of a DAS. By transporting only data compliant with the O-RAN compliant packet format, management of the DAS is simplified, e.g., muting uplink channels. By transporting frequency-domain digital data in an O-RAN compliant packet format, bandwidth consumption in the fronthaul is diminished. Prior to describing the invention, exemplary DASs are illustrated.

Figure 1A:
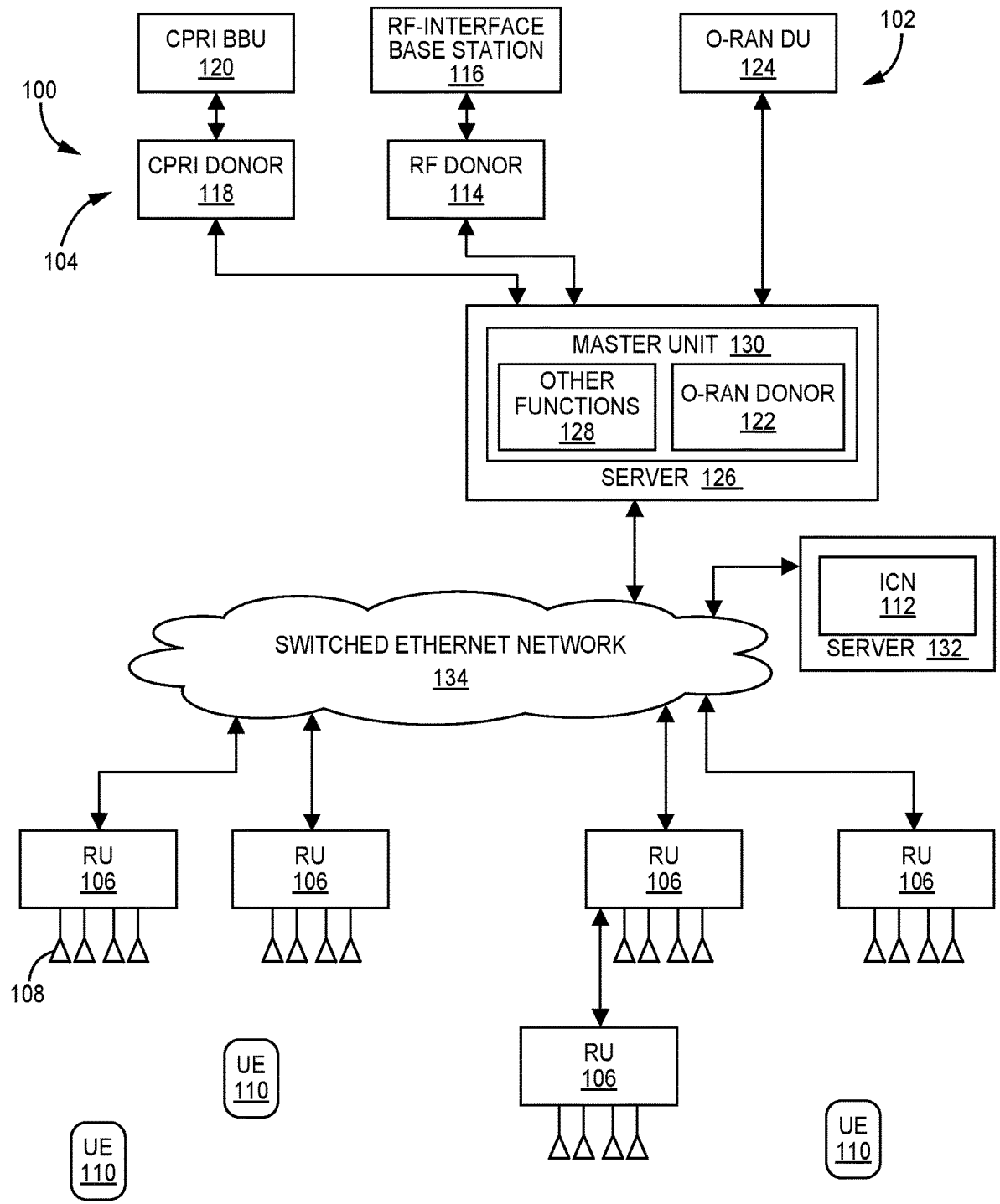
FIG. 1A is a block diagram illustrating an exemplary embodiment of a distributed antenna system (DAS) that is configured to serve one or more base stations.

FIG. 1A is a block diagram illustrating an exemplary embodiment of a distributed antenna system (DAS) 100 that is configured to serve one or more base stations 102. In the exemplary embodiment shown in FIG. 1A, the DAS 100 includes one or more donor units 104 that are used to couple the DAS 100 to the base stations 102. The DAS 100 also includes a plurality of remotely located radio units (RUs) 106 (also referred to as "antenna units," "access points," "remote units," or "remote antenna units"). The RUs 106 are communicatively coupled to the donor units 104. A donor unit may also be referred to herein as a donor interface or a donor interface circuit.

Each RU 106 includes, or is otherwise associated with, a respective set of coverage antennas 108 via which downlink analog RF signals can be radiated to user equipment (UEs) 110 and via which uplink analog RF signals transmitted by UEs 110 can be received. The DAS 100 is configured to serve each base station 102 using a respective subset of RUs 106 (which may include less than all of the RUs 106 of the DAS 100). Also, the subsets of RUs 106 used to serve the base stations 102 may differ from base station 102 to base station 102. The subset of RUs 106 used to serve a given base station 102 is also referred to here as the "simulcast zone" for that base station 102. In general, the wireless coverage of a base station 102 served by the DAS 100 is improved by radiating a set of downlink RF signals for that base station 102 from the coverage antennas 108 associated with the multiple RUs 106 in that base station's stations simulcast zone and by producing a single "combined" set of uplink base station signals or data that is provided to that base station 102. The single combined set of uplink base station signals or data is produced by a combining or summing process that uses inputs derived from the uplink RF signals received via the coverage antennas 108 associated with the RUs 106 in that base station's simulcast zone.

The DAS 100 can also include one or more intermediary combining nodes (ICNs) 112 (also referred to as "expansion" units or nodes). For each base station 102 served by a given ICN 112, the ICN 112 is configured to receive a set of uplink transport data for that base station 102 from a group of "southbound" entities (that is, from RUs 106 and/or other ICNs 112) and generate a single set of combined uplink transport data for that base station 102, which the ICN 112 transmits "northbound" towards the donor unit 104 serving that base station 102. The single set of combined uplink transport data for each served base station 102 is produced by a combining or summing process that uses inputs derived from the uplink RF signals received via the coverage antennas 108 of any southbound RUs 106 included in that base station's simulcast zone. As used here, "southbound" refers to traveling in a direction "away," or being relatively "farther," from the donor units 104 and base stations 102, and "northbound" refers to traveling in a direction "towards", or being relatively "closer" to, the donor units 104 and base stations 102.

In some configurations, each ICN 112 also forwards downlink transport data to the group of southbound RUs 106 and/or ICNs 112 served by that ICN 112. Generally, ICNs 112 can be used to increase the number of RUs 106 that can be served by the donor units 104 while reducing the processing and bandwidth load relative to having the additional RUs 106 communicate directly with each such donor unit 104.

Also, one or more RUs 106 can be configured in a "daisy-chain" or "ring" configuration in which transport data for at least some of those RUs 106 is communicated via at least one other RU 106. Each RU 106 would also perform the combining or summing process for any base station 102 that is served by that RU 106 and one or more of the southbound entities subtended from that RU 106. (Such a RU 106 also forwards northbound all other uplink transport data received from its southbound entities.)

The DAS 100 can include various types of donor units 104. One example of a donor unit 104 is an RF donor unit 114 that is configured to couple the DAS 100 to a base station 116 using the external analog radio frequency (RF) interface of the base station 116 that would otherwise be used to couple the base station 116 to one or more antennas (if the DAS 100 were not being used). This type of base station 116 is also referred to here as an "RF-interface" base station 116. An RF-interface base station 116 can be coupled to a corresponding RF donor unit 114 by coupling each antenna port of the base station 116 to a corresponding port of the RF donor unit 114.

Each RF donor unit 114 serves as an interface between each served RF-interface base station 116 and the rest of the DAS 100 and receives downlink base station signals from, and outputs uplink base station signals to, each served RF-interface base station 116. Each RF donor unit 114 performs at least some of the conversion processing necessary to convert the base station signals to and from the digital fronthaul interface format natively used in the DAS 100 for communicating time-domain baseband data. The downlink and uplink base station signals communicated between the RF-interface base station 116 and the donor unit 114 are analog RF signals. Also, in this example, the digital fronthaul interface format natively used in the DAS 100 for communicating time-domain baseband data can comprise the O-RAN fronthaul interface, a CPRI or enhanced CPRI (eCPRI) digital fronthaul interface format, or a proprietary digital fronthaul interface format (though other digital fronthaul interface formats can also be used).

Another example of a donor unit 104 is a digital donor unit that is configured to communicatively couple the DAS 100 to a baseband entity using a digital baseband fronthaul interface that would otherwise be used to couple the baseband entity to a radio unit (if the DAS 100 were not being used). In the example shown in FIG. 1A, two types of digital door units are shown.

The first type of digital donor unit comprises a digital donor unit 118 that is configured to communicatively couple the DAS 100 to a baseband unit (BBU) 120 using a time-domain baseband fronthaul interface implemented in accordance with a Common Public Radio Interface ("CPRI") specification. This type of digital donor unit 118 is also referred to here as a "CPRI" donor unit 118, and this type of BBU 120 is also referred to here as a CPRI BBU 120. For each CPRI BBU 120 served by a CPRI donor unit 118, the CPRI donor unit 118 is coupled to the CPRI BBU 120 using the CPRI digital baseband fronthaul interface that would otherwise be used to couple the CPRI BBU 120 to a CPRI remote radio head (RRH) (if the DAS 100 were not being used). A CPRI BBU 120 can be coupled to a corresponding CPRI donor unit 118 via a direct CPRI connection.

Each CPRI donor unit 118 serves as an interface between each served CPRI BBU 120 and the rest of the DAS 100 and receives downlink base station signals from, and outputs uplink base station signals to, each CPRI BBU 120. Each CPRI donor unit 118 performs at least some of the conversion processing necessary to convert the CPRI base station data to and from the digital fronthaul interface format natively used in the DAS 100 for communicating time-domain baseband data. The downlink and uplink base station signals communicated between each CPRI BBU 120 and the CPRI donor unit 118 comprise downlink and uplink fronthaul data generated and formatted in accordance with the CPRI baseband fronthaul interface.

The second type of digital donor unit comprises a digital donor unit 122 that is configured to communicatively couple the DAS 100 to a BBU 120 using a frequency-domain baseband fronthaul interface implemented in accordance with a O-RAN Alliance specification. The acronym "O-RAN" is an abbreviation for "Open Radio Access Network." This type of digital donor unit 122 is also referred to here as an "O-RAN" donor unit 122, and this type of BBU 124 is typically an O-RAN distributed unit (DU) and is also referred to here as an O-RAN DU 124. For each O-RAN DU 124 served by a O-RAN donor unit 122, the O-RAN donor unit 122 is coupled to the O-DU 124 using the O-RAN digital baseband fronthaul interface that would otherwise be used to couple the O-RAN DU 124 to a O-RAN RU (if the DAS 100 were not being used). An O-RAN DU 124 can be coupled to a corresponding O-RAN donor unit 122 via a switched Ethernet network. Alternatively, an O-RAN DU 124 can be coupled to a corresponding O-RAN donor unit 122 via a direct Ethernet or CPRI connection.

Each O-RAN donor unit 122 serves as an interface between each served O-RAN DU 124 and the rest of the DAS 100 and receives downlink base station signals from, and outputs uplink base station signals to, each O-RAN DU 124. Each O-RAN donor unit 122 performs at least some of any conversion processing necessary to convert the base station signals to and from the digital fronthaul interface format natively used in the DAS 100 for communicating frequency-domain baseband data. The downlink and uplink base station signals communicated between each O-RAN DU 124 and the O-RAN donor unit 122 comprise downlink and uplink fronthaul data generated and formatted in accordance with the O-RAN baseband fronthaul interface, where the user-plane data comprises frequency-domain baseband IQ data. Also, in this example, the digital fronthaul interface format natively used in the DAS 100 for communicating O-RAN fronthaul data is the same O-RAN fronthaul interface used for communicating base station signals between each O-RAN DU 124 and the O-RAN donor unit 122, and the "conversion" performed by each O-RAN donor unit 122 (and/or one or more other entities of the DAS 100) includes performing any needed "multicasting" of the downlink data received from each O-RAN DU 124 to the multiple RUs 106 in a simulcast zone for that O-RAN DU 124 (for example, by communicating the downlink fronthaul data to an appropriate multicast address and/or by copying the downlink fronthaul data for communication over different fronthaul links) and performing any need combining or summing of the uplink data received from the RUs 106 to produce combined uplink data provided to the O-RAN DU 124. It is to be understood that other digital fronthaul interface formats can also be used.

Optionally, each RF donor and CPRI donor can be deployed in the same physical server used to implement the master unit (for example, where the RF donor and CPRI donor communicates with the master unit using a PCIe lane of the physical server). Alternatively, each RFD card and CPRI digital donor card can be deployed as a standalone device that communicates with the master unit (and/or other nodes or components of the DAS) via a switched Ethernet network that is otherwise used for communications between the nodes of the DAS.

In general, the various base stations 102 are configured to communicate with a core network (not shown) of the associated wireless operator using an appropriate backhaul network (typically, a public wide area network such as the Internet). Also, the various base stations 102 may be from multiple, different wireless operators and/or the various base stations 102 may support multiple, different wireless protocols and/or RF bands.

In general, for each base station 102, the DAS 100 is configured to receive a set of one or more downlink base station signals from the base station 102 (via an appropriate donor unit 104), generate downlink transport data derived from the set of downlink base station signals, and transmit the downlink transport data to the RUs 106 in the base station's simulcast zone. For each base station 102 served by a given RU 106, the RU 106 is configured to receive the downlink transport data transmitted to it via the DAS 100 and use the received downlink transport data to generate one or more downlink analog radio frequency signals that are radiated from one or more coverage antennas 108 associated with that RU 106 for reception by user equipment 110. In this way, the DAS 100 increases the coverage area for the downlink capacity provided by the base stations 102. Also, for any southbound entities (for example, southbound RUs 106 or ICNs 112) coupled to the RU 106 (for example, in a daisy chain or ring architecture), the RU 106 forwards any downlink transport data intended for those southbound entities towards them.

For each base station 102 served by a given RU 106, the RU 106 is configured to receive one or more uplink radio frequency signals transmitted from the user equipment 110. These signals are analog radio frequency signals and are received via the coverage antennas 108 associated with that RU 106. The RU 106 is configured to generate uplink transport data derived from the one or more remote uplink radio frequency signals received for the served base station 102 and transmit the uplink transport data northbound towards the donor unit 104 coupled to that base station 102.

For each base station 102 served by the DAS 100, a single "combined" set of uplink base station signals or data is produced by a combining or summing process that uses inputs derived from the uplink RF signals received via the RUs 106 in that base station's simulcast zone. The resulting final single combined set of uplink base station signals or data is provided to the base station 102. This combining or summing process can be performed in a centralized manner in which the combining or summing process is performed by a single unit of the DAS 100 (for example, a donor unit 104 or master unit 130). This combining or summing process can also be performed in a distributed or hierarchical manner in which the combining or summing process is performed by multiple units of the DAS 100 (for example, a donor unit 104 (or master unit 130) and one or more ICNs 112 and/or RUs 106). Each unit of the DAS 100 that performs the combining or summing process for a given base station 102 receives uplink transport data from that unit's southbound entities and uses that data to generate combined uplink transport data, which the unit transmits northbound towards the base station 102. The generation of the combined uplink transport data involves, among other things, extracting in-phase and quadrature (IQ) data from the received uplink transport data and performing a combining or summing process using any uplink IQ data for that base station 102 in order to produce combined uplink IQ data.

Some of the details regarding how base station signals or data are communicated and transport data is produced vary based on which type of base station 102 is being served. In the case of an RF-interface base station 116, the associated RF donor unit 114 receives analog downlink RF signals from the RF-interface base station 116 and, either alone or in combination with one or more other units of the DAS 100, converts the received analog downlink RF signals to the digital fronthaul interface format natively used in the DAS 100 for communicating time-domain baseband data (for example, by digitizing, digitally down-converting, and filtering the received analog downlink RF signals in order to produce digital baseband IQ data and formatting the resulting digital baseband IQ data into packets) and communicates the resulting packets of downlink transport data to the various RUs 106 in the simulcast zone of that base station 116. The RUs 106 in the simulcast zone for that base station 116 receive the downlink transport data and use it to generate and radiate downlink RF signals as described above. In the uplink, either alone or in combination with one or more other units of the DAS 100, the RF donor unit 114 generates a set of uplink base station signals from uplink transport data received by the RF donor unit 114 (and/or the other units of the DAS 100 involved in this process). The set of uplink base station signals is provided to the served base station 116. The uplink transport data is derived from the uplink RF signals received at the RUs 106 in the simulcast zone of the served base station 116 and communicated in packets.

In the case of a CPRI BBU 120, the associated CPRI digital donor unit 118 receives CPRI downlink fronthaul data from the CPRI BBU 120 and, either alone or in combination with another unit of the DAS 100, converts the received CPRI downlink fronthaul data to the digital fronthaul interface format natively used in the DAS 100 for communicating time-domain baseband data (for example, by re-sampling, synchronizing, combining, separating, gain adjusting, etc. the CPRI baseband IQ data, and formatting the resulting baseband IQ data into packets), and communicates the resulting packets of downlink transport data to the various RUs 106 in the simulcast zone of that CPRI BBU 120. The RUs 106 in the simulcast zone of that CPRI BBU 120 receive the packets of downlink transport data and use them to generate and radiate downlink RF signals as described above. In the uplink, either alone or in combination with one or more other units of the DAS 100, the CPRI donor unit 118 generates uplink base station data from uplink transport data received by the CPRI donor unit 118 (and/or the other units of the DAS 100 involved in this process). The resulting uplink base station data is provided to that CPRI BBU 120. The uplink transport data is derived from the uplink RF signals received at the RUs 106 in the simulcast zone of the CPRI BBU 120.

In the case of an O-RAN DU 124, the associated O-RAN donor unit 122 receives packets of O-RAN downlink fronthaul data (that is, O-RAN user-plane and control-plane messages) from each O-RAN DU 124 coupled to that O-RAN digital donor unit 122 and, either alone or in combination with another unit of the DAS 100, converts (if necessary) the received packets of O-RAN downlink fronthaul data to the digital fronthaul interface format natively used in the DAS 100 for communicating O-RAN baseband data and communicates the resulting packets of downlink transport data to the various RUs 106 in a simulcast zone for that ORAN DU 124. The RUs 106 in the simulcast zone of each O-RAN DU 124 receive the packets of downlink transport data and use them to generate and radiate downlink RF signals as described above. In the uplink, either alone or in combination with one or more other units of the DAS 100, the O-RAN donor unit 122 generates packets of uplink base station data from uplink transport data received by the O-RAN donor unit 122 (and/or the other units of the DAS 100 involved in this process). The resulting packets of uplink base station data are provided to the O-RAN DU 124. The uplink transport data is derived from the uplink RF signals received at the RUs 106 in the simulcast zone of the served O-RAN DU 124 and communicated in packets.

In one implementation, one of the units of the DAS 100 is also used to implement a "master" timing entity for the DAS 100 (for example, such a master timing entity can be implemented as a part of a master unit 130 described below). In another example, a separate, dedicated timing master entity (not shown) is provided within the DAS 100. In either case, the master timing entity synchronizes itself to an external timing master entity (for example, a timing master associated with one or more of the O-DUs 124) and, in turn, that entity serves as a timing master entity for the other units of the DAS 100. A time synchronization protocol (for example, the Institute of Electrical and Electronics Engineers (IEEE) 1588 Precision Time Protocol (PTP), the Network Time Protocol (NTP), or the Synchronous Ethernet (SyncE) protocol) can be used to implement such time synchronization.

A management system (not shown) can be used to manage the various nodes of the DAS 100. In one implementation, the management system communicates with a predetermined "master" entity for the DAS 100 (for example, the master unit 130 described below), which in turns forwards or otherwise communicates with the other units of the DAS 100 for management-plane purposes. In another implementation, the management system communicates with the various units of the DAS 100 directly for management-plane purposes (that is, without using a master entity as a gateway).

Each base station 102 (including each RF-interface base station 116, CPRI BBU 120, and O-RAN DU 124), donor unit 104 (including each RF donor unit 114, CPRI donor unit 118, and O-RAN donor unit 122), RU 106, ICN 112, and any of the specific features described here as being implemented thereby, can be implemented in hardware, software, or combinations of hardware and software, and the various implementations (whether hardware, software, or combinations of hardware and software) can also be referred to generally as "circuitry," a "circuit," or "circuits" that is or are configured to implement at least some of the associated functionality. When implemented in software, such software can be implemented in software or firmware executing on one or more suitable programmable processors (or other programmable device) or configuring a programmable device (for example, processors or devices included in or used to implement special-purpose hardware, general-purpose hardware, and/or a virtual platform). In such a software example, the software can comprise program instructions that are stored (or otherwise embodied) on or in an appropriate non-transitory storage medium or media (such as flash or other non-volatile memory, magnetic disc drives, and/or optical disc drives) from which at least a portion of the program instructions are read by the programmable processor or device for execution thereby (and/or for otherwise configuring such processor or device) in order for the processor or device to perform one or more functions described here as being implemented the software. Such hardware or software (or portions thereof) can be implemented in other ways (for example, in an application specific integrated circuit (ASIC), etc.). Such entities can be implemented in other ways.

The DAS 100 can be implemented in a virtualized manner or a non-virtualized manner. When implemented in a virtualized manner, one or more nodes, units, or functions of the DAS 100 are implemented using one or more virtual network functions (VNFs) executing on one or more physical server computers (also referred to here as "physical servers" or just "servers") (for example, one or more commercial-off-the-shelf (COTS) servers of the type that are deployed in data centers or "clouds" maintained by enterprises, communication service providers, or cloud services providers). More specifically, in the exemplary embodiment shown in FIG. 1A, each O-RAN donor unit 122 is implemented as a VNF running on a server 126. The server 126 can execute other VNFs 128 that implement other functions for the DAS 100 (for example, fronthaul, management plane, and synchronization plane functions). The various VNFs executing on the server 126 are also referred to here as "master unit" functions 130 or, collectively, as the "master unit" 130. Also, in the exemplary embodiment shown in FIG. 1A, each ICN 112 is implemented as a VNF running on a server 132.

The RF donor units 114 and CPRI donor units 118 can be implemented as cards (for example, Peripheral Component Interconnect (PCI) Cards) that are inserted in the server 126. Alternatively, the RF donor units 114 and CPRI donor units 118 can be implemented as separate devices that are coupled to the server 126 via dedicated Ethernet links or via a switched Ethernet network (for example, the switched Ethernet network 134 described below).

In the exemplary embodiment shown in FIG. 1A, the donor units 104, RUs 106 and ICNs 112 are communicatively coupled to one another via a switched Ethernet network 134. Also, in the exemplary embodiment shown in FIG. 1A, an O-RAN DU 124 can be coupled to a corresponding O-RAN donor unit 122 via the same switched Ethernet network 134 used for communication within the DAS 100 (though each O-RAN DU 124 can be coupled to a corresponding O-RAN donor unit 122 in other ways). In the exemplary embodiment shown in FIG. 1A, the downlink and uplink transport data communicated between the units of the DAS 100 is formatted as O-RAN data that is communicated in Ethernet packets over the switched Ethernet network 134.

In the exemplary embodiment shown in FIG. 1A, the RF donor units 114 and CPRI donor units 118 are coupled to the RUs 106 and ICNs 112 via the master unit 130.

In the downlink, the RF donor units 114 and CPRI donor units 118 provide downlink time-domain baseband IQ data to the master unit 130. The master unit 130 generates downlink O-RAN user-plane messages containing downlink baseband IQ that is either the time-domain baseband IQ data provided from the donor units 114 and 118 or is derived therefrom (for example, where the master unit 130 converts the received time-domain baseband IQ data into frequency-domain baseband IQ data). The master unit 130 also generates corresponding downlink O-RAN control-plane messages for those O-RAN user-plane messages. The resulting downlink O-RAN user-plane and control-plane messages are communicated (multicasted) to the RUs 106 in the simulcast zone of the corresponding base station 102 via the switched Ethernet network 134.

In the uplink, for each RF-interface base station 116 and CPRI BBU 120, the master unit 130 receives O-RAN uplink user-plane messages for the base station 116 or CPRI BBU 120 and performs a combining or summing process using the uplink baseband IQ data contained in those messages in order to produce combined uplink baseband IQ data, which is provided to the appropriate RF donor unit 114 or CPRI donor unit 118. The RF donor unit 114 or CPRI donor unit 118 uses the combined uplink baseband IQ data to generate a set of base station signals or CPRI data that is communicated to the corresponding RF-interface base station 116 or CPRI BBU 120. If time-domain baseband IQ data has been converted into frequency-domain baseband IQ data for transport over the DAS 100, the donor unit 114 or 118 also converts the combined uplink frequency-domain IQ data into combined uplink time-domain IQ data as part of generating the set of base station signals or CPRI data that is communicated to the corresponding RF-interface base station 116 or CPRI BBU 120.

In the exemplary embodiment shown in FIG. 1A, the master unit 130 (more specifically, the O-RAN donor unit 122) receives downlink O-RAN user-plane and control-plane messages from each served O-RAN DU 124 and communicates (multicasts) them to the RUs 106 in the simulcast zone of the corresponding O-RAN DU 124 via the switched Ethernet network 134. In the uplink, the master unit 130 (more specifically, the O-RAN donor unit 122) receives O-RAN uplink user-plane messages for each served O-RAN DU 124 and performs a combining or summing process using the uplink baseband IQ data contained in those messages in order to produce combined uplink IQ data. The O-RAN donor unit 122 produces O-RAN uplink user-plane messages containing the combined uplink baseband IQ data and communicates those messages to the O-RAN DU 124.

In the exemplary embodiment shown in FIG. 1A, only uplink transport data is communicated using the ICNs 112, and downlink transport data is communicated from the master unit 130 to the RUs 106 without being forwarded by, or otherwise communicated using, the ICNs 112.

Figure 1B:
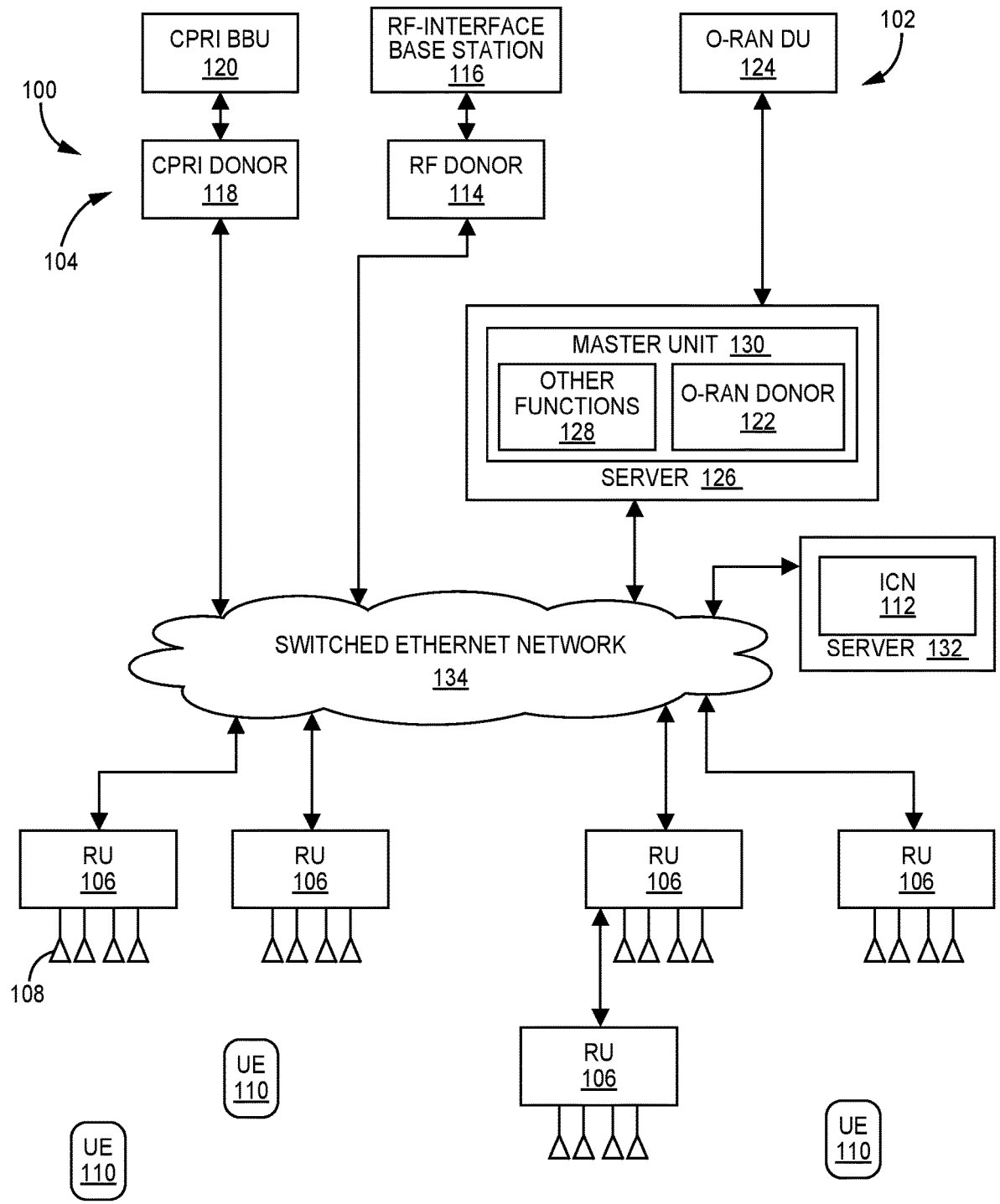
FIG. 1B illustrates another exemplary embodiment of a DAS.

FIG. 1B illustrates another exemplary embodiment of a DAS 100. The DAS 100 shown in FIG. 1B is the same as the DAS 100 shown in FIG. 1A except as described below. In the exemplary embodiment shown in FIG. 1B, the RF donor units 114 and CPRI donor units 118 are coupled directly to the switched Ethernet network 134 and not via the master unit 130, as is the case in the embodiment shown in FIG. 1A.

As described above, in the exemplary embodiment shown in FIG. 1A, the master unit 130 performs some transport functions related to serving the RF-interface base stations 116 and CPRI BBUs 120 coupled to the donor units 114 and 118. In the exemplary embodiment shown in FIG. 1B, the RF donor units 114 and CPRI donor units 118 perform those transport functions (that is, the RF donor units 114 and CPRI donor units 118 perform all of the transport functions related to serving the RF-interface base stations 116 and CPRI BBUs 120, respectively).

Figure 1C:
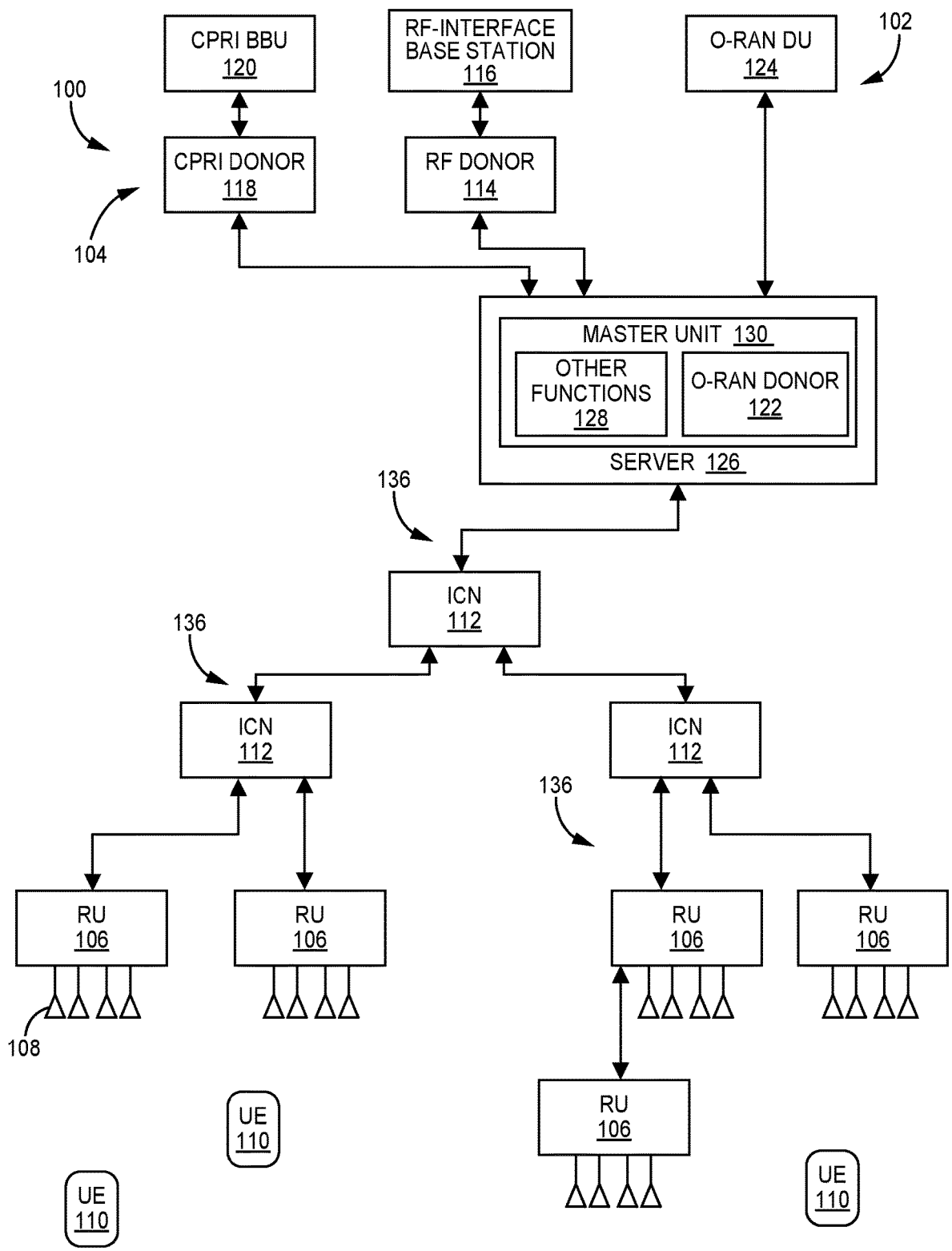
FIG. 1C illustrates another exemplary embodiment of a DAS.

FIG. 1C illustrates another exemplary embodiment of a DAS 100. The DAS 100 shown in FIG. 1C is the same as the DAS 100 shown in FIG. 1A except as described below. In the exemplary embodiment shown in FIG. 1C, the donor units 104, RUs 106 and ICNs 112 are communicatively coupled to one another via point-to-point Ethernet links 136 (instead of a switched Ethernet network). Also, in the exemplary embodiment shown in FIG. 1C, an O-RAN DU 124 can be coupled to a corresponding O-RAN donor unit 122 via a switched Ethernet network (not shown in FIG. 1C), though that switched Ethernet network is not used for communication within the DAS 100. In the exemplary embodiment shown in FIG. 1C, the downlink and uplink transport data communicated between the units of the DAS 100 is communicated in Ethernet packets over the point-to-point Ethernet links 136.

For each southbound point-to-point Ethernet link 136 that couples a master unit 130 to an ICN 112, the master unit 130 assembles downlink transport frames and communicates them in downlink Ethernet packets to the ICN 112 over the point-to-point Ethernet link 136. For each point-to-point Ethernet link 136, each downlink transport frame multiplexes together downlink time-domain baseband IQ data and Ethernet data that needs to be communicated to southbound RUs 106 and ICNs 112 that are coupled to the master unit 130 via that point-to-point Ethernet link 136. The downlink time-domain baseband IQ data is sourced from one or more RF donor units 114 and/or CPRI donor units 118. The Ethernet data comprises downlink user-plane and control-plane O-RAN fronthaul data sourced from one or more O-RAN donor units 122 and/or management-plane data sourced from one or more management entities for the DAS 100. That is, this Ethernet data is encapsulated into downlink transport frames that are also used to communicate downlink time-domain baseband IQ data and this Ethernet data is also referred to here as "encapsulated" Ethernet data. The resulting downlink transport frames are communicated in the payload of downlink Ethernet packets communicated from the master unit 130 to the ICN 112 over the point-to-point Ethernet link 136. The Ethernet packets into which the encapsulated Ethernet data is encapsulated are also referred to here as "transport" Ethernet packets.

Each ICN 112 receives downlink transport Ethernet packets via each northbound point-to-point Ethernet link 136 and extracts any downlink time-domain baseband IQ data and/or encapsulated Ethernet data included in the downlink transport frames communicated via the received downlink transport Ethernet packets. Any encapsulated Ethernet data that is intended for the ICN 112 (for example, management-plane Ethernet data) is processed by the ICN 112.

For each southbound point-to-point Ethernet link 136 coupled to the ICN 112, the ICN 112 assembles downlink transport frames and communicates them in downlink Ethernet packets to the southbound entities subtended from the ICN 112 via the point-to-point Ethernet link 136. For each southbound point-to-point Ethernet link 136, each downlink transport frame multiplexes together downlink time-domain baseband IQ data and Ethernet data received at the ICN 112 that needs to be communicated to those subtended southbound entities. The resulting downlink transport frames are communicated in the payload of downlink transport Ethernet packets communicated from the ICN 112 to those subtended southbound entities ICN 112 over the point-to-point Ethernet link 136.

Each RU 106 receives downlink transport Ethernet packets via each northbound point-to-point Ethernet link 136 and extracts any downlink time-domain baseband IQ data and/or encapsulated Ethernet data included in the downlink transport frames communicated via the received downlink transport Ethernet packets. As described above, the RU 106 uses any downlink time-domain baseband IQ data and/or downlink O-RAN user-plane and control-plane fronthaul messages to generate downlink RF signals for radiation from the set of coverage antennas 108 associated with that RU 106. The RU 106 processes any management-plane messages communicated to that RU 106 via encapsulated Ethernet data.

Also, for any southbound point-to-point Ethernet link 136 coupled to the RU 106, the RU 106 assembles downlink transport frames and communicates them in downlink Ethernet packets to the southbound entities subtended from the RU 106 via the point-to-point Ethernet link 136. For each southbound point-to-point Ethernet link 136, each downlink transport frame multiplexes together downlink time-domain baseband IQ data and Ethernet data received at the RU 106 that needs to be communicated to those subtended southbound entities. The resulting downlink transport frames are communicated in the payload of downlink transport Ethernet packets communicated from the RU 106 to those subtended southbound entities ICN 112 over the point-to-point Ethernet link 136.

In the uplink, each RU 106 generates uplink time-domain baseband IQ data and/or uplink O-RAN user-plane fronthaul messages for each RF-interface base station 116, CPRI BBU 120, and/or O-RAN DU 124 served by that RU 106 as described above. For each northbound point-to-point Ethernet link 136 of the RU 106, the RU 106 assembles uplink transport frames and communicates them in uplink transport Ethernet packets northbound towards the appropriate master unit 130 via that point-to-point Ethernet link 136. For each northbound point-to-point Ethernet link 136, each uplink transport frame multiplexes together uplink time-domain baseband IQ data originating from that RU 106 and/or any southbound entity subtended from that RU 106 as well as any Ethernet data originating from that RU 106 and/or any southbound entity subtended from that RU 106. In connection with doing this, the RU 106 performs the combining or summing process described above for any base station 102 served by that RU 106 and also by one or more of the subtended entities. (The RU 106 forwards northbound all other uplink data received from those southbound entities.) The resulting uplink transport frames are communicated in the payload of uplink transport Ethernet packets northbound towards the master unit 130 via the associated point-to-point Ethernet link 136.

Each ICN 112 receives uplink transport Ethernet packets via each southbound point-to-point Ethernet link 136 and extracts any uplink time-domain baseband IQ data and/or encapsulated Ethernet data included in the uplink transport frames communicated via the received uplink transport Ethernet packets. For each northbound point-to-point Ethernet link 136 coupled to the ICN 112, the ICN 112 assembles uplink transport frames and communicates them in uplink transport Ethernet packets northbound towards the master unit 130 via that point-to-point Ethernet link 136. For each northbound point-to-point Ethernet link 136, each uplink transport frame multiplexes together uplink time-domain baseband IQ data and Ethernet data received at the ICN 112 that needs to be communicated northbound towards the master unit 130. The resulting uplink transport frames are communicated in the payload of uplink transport Ethernet packets communicated northbound towards the master unit 130 over the point-to-point Ethernet link 136. In connection with doing this, the ICN 112 performs the combining or summing process described above for any base station 102 served by that ICN 112 for which it has received uplink baseband IQ data from multiple entities subtended from that ICN 112.

Each master unit 130 receives uplink transport Ethernet packets via each southbound point-to-point Ethernet link 136 and extracts any uplink time-domain baseband IQ data and/or encapsulated Ethernet data included in the uplink transport frames communicated via the received uplink transport Ethernet packets. Any extracted uplink time-domain baseband IQ data, as well as any uplink O-RAN messages communicated in encapsulated Ethernet, is used in producing a single "combined" set of uplink base station signals or data for the associated base station 102 as described above (which includes performing the combining or summing process). Any other encapsulated Ethernet data (for example, management-plane Ethernet data) is forwarded on towards the respective destination (for example, a management entity).

In the exemplary embodiment shown in FIG. 1C, synchronization-plane messages are communicated using native Ethernet packets (that is, non-encapsulated Ethernet packets) that are interleaved between the transport Ethernet packets.

Figure 1D:
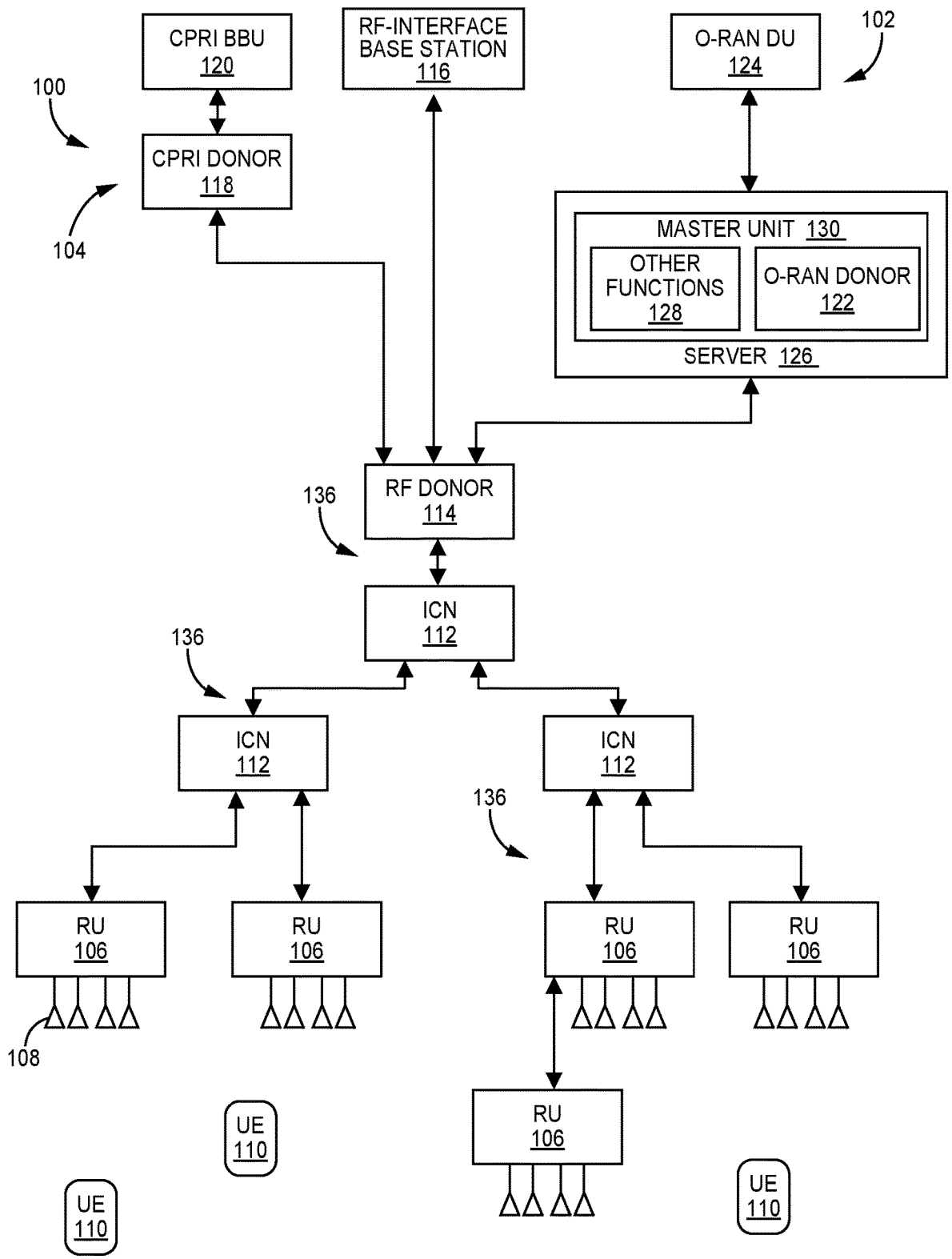
FIG. 1D illustrates another exemplary embodiment of a DAS.

FIG. 1D illustrates another exemplary embodiment of a DAS 100. The DAS 100 shown in FIG. 1C is the same as the DAS 100 shown in FIG. 1C except as described below. In the exemplary embodiment shown in FIG. 1D, the CPRI donor units 118, O-RAN donor unit 122, and master unit 130 are coupled to the RUs 106 and ICNs 112 via one or more RF units 114. That is, each RF donor unit 114 performs the transport frame multiplexing and demultiplexing that is described above in connection with FIG. 1C as being performed by the master unit 130.

Embodiments of the invention may be implemented in the DASs illustrated in FIGS. 1A-1D. It is to be understood that embodiments of the invention may be utilized in other DAS implementations (for example, in a DAS that uses traditional fronthaul transport).

Figure 2:
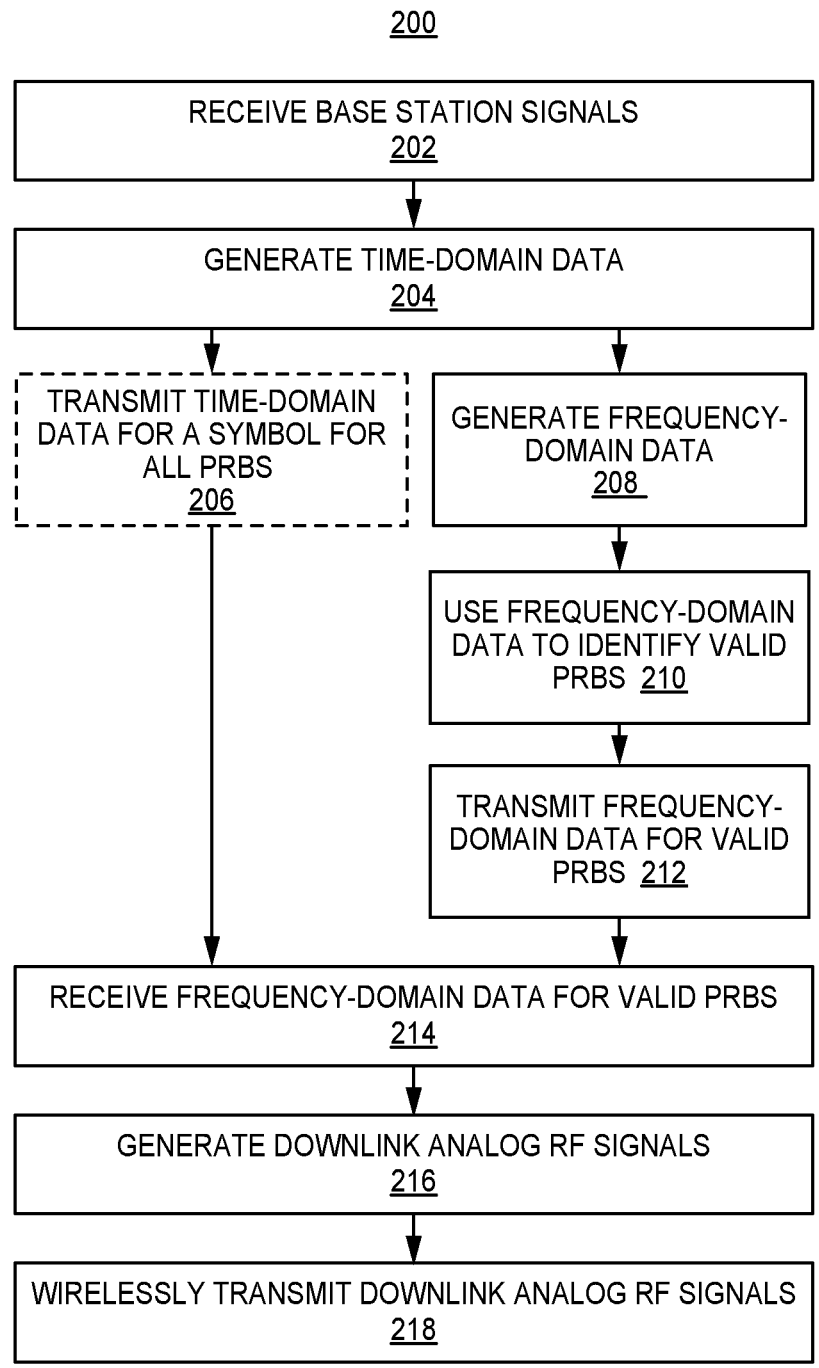
FIG. 2 comprises a high-level flowchart illustrating one exemplary embodiment of a method of performing selective muting in an downlink path of a distributed antenna system.

Embodiments of the invention that are configured to improve DAS fronthaul transport bandwidth for base stations and that interface with the DAS using time-domain signals will now be illustrated. FIG. 2 comprises a high-level flow chart illustrating one exemplary embodiment of a method 200 of performing selective muting in a downlink path of a distributed antenna system. The embodiment of method 200 shown in FIG. 2 is described here as being implemented using the DAS 100 described above in connection with FIGS. 1A-1D. However, it is to be understood that other embodiments can be implemented in other ways.

The blocks of the flow diagram shown in FIG. 2 have been arranged in a generally sequential manner for ease of explanation; however, it is to be understood that this arrangement is merely exemplary, and it should be recognized that the processing associated with method 200 (and the blocks shown in FIG. 2) can occur in a different order (for example, where at least some of the processing associated with the blocks is performed in parallel and/or in an event-driven manner). Also, most standard exception handling is not described for ease of explanation; however, it is to be understood that method 200 can and typically would include such exception handling. Moreover, one or more aspects of method 200 can be configurable or adaptive (either manually or in an automated manner). Each method described herein may be implemented as software executable on programmable processor(s).

The master unit 130 and/or donor unit 114 or 118 for each RF-interface base station 116 and CPRI BBU 120, for each slot, receiving a downlink base station signal or stream of time-domain baseband IQ data for each downlink antenna port of the RF-interface base station 116 or CPRI BBU 120 (block 202), generates time-domain baseband IQ data for each downlink antenna port for a slot (if necessary) (optional block 204), using the time-domain baseband IQ data for the slot, generates frequency-domain baseband IQ data for each downlink antenna port for that slot (block 208), uses the frequency-domain baseband IQ data for each downlink antenna port for that slot to identify valid PRBs for that slot (block 210), and transmits frequency-domain baseband IQ data for only valid PRBs over the DAS 100 towards the RUs 106 in the simulcast zone of that base station 116 or BBU 120 (block 212).

The 4G and 5G standards use the PRB as the smallest element of resource allocation assigned by a scheduler in a radio access network (RAN). Each PRB includes numerous, e.g., twelve, subcarriers. Determining whether a PRB is respectively a valid PRB, may be done by determining whether a power level of each subcarrier of a subset of subcarriers comprising respectively the PRB exceeds a threshold power level. The subset of subcarriers may comprise one, two, three, or more subcarriers; such subcarriers may be any of the subcarriers comprising respectively the PRB. The threshold power level may differ between the DL and the UL. By performing such a power analysis on a subset of subcarriers which comprise the PRB, computational requirements are diminished and/or processing speed is increased. In one embodiment, whether a power level of one subcarrier in each PRB exceeds the threshold power level can be evaluated. That is, for example, the power level of the first, e.g., the $0^{th}$, subcarrier, the last, e.g., the $12^{th}$, subcarrier, or another subcarrier of respectively the PRB or the slot may be validated as described above. This embodiment reduces the computation time by 11 times per symbol.

In this example, the time-domain data that would otherwise be communicated over a front haul[1] is converted to frequency-domain data. However, because there is additional latency involved with doing this conversion, in one embodiment, for each slot, the time-domain data for a symbol, e.g., a first or another symbol[2], of the slot is communicated immediately and, at the same time and in parallel, the time-domain data for the symbol is converted from the time-domain to the frequency-domain and then the PRB-by-PRB checking described below is performed using the frequency-domain data for that symbol in order to determine if each PRB for that slot is a valid PRB. If that PRB is not a valid PRB, then no additional data for that PRB is transported over the fronthaul and the symbol is discarded by the end point (for example, is discarded by each access point in the downlink or discarded by the master unit, e.g., a virtual master unit (vMU), or ICN in the uplink). If that PRB is transmitting valid data, user-plane packets and control-plane (for example, O-RAN user-plane and control-plane packets) are generated to transport the frequency-domain data for the other, e.g., subsequent, symbols for that PRB to the one or more end-points. The end-points then inspect the control-plane packets to identify which PRBs are conveying valid data and then processes the time-domain data for the symbol and the frequency-domain data for the remaining symbols for those PRBs of that slot. The aforementioned discussion of PRBs is applicable to both FIGS. 2 and 3.

[1] The front haul is between an access point and either a MU, e.g., a virtual master unit (vMU), or an intermediate combining node (ICN) of the DAS.
[2] Optionally, the other symbol is a symbol expected to include a demodulation reference signal.

As noted above, the exemplary embodiment described here in connection with FIG. 2 is described here as being implemented using the DAS 100 described above in connection with FIGS. 1A-1D. As noted above, the DAS 100 described above in connection with FIGS. 1A-1D includes a master timing entity (for example, the master unit 130) that is synchronized to the time base used by the source base stations 102. This time base then can be used by the various entities in the DAS 100 to determine the slot-related timing for each base station 102 (for example, by determining a system frame number (SFN), at least one frame, at least one subframe (SF(s)) in each frame, at least one slot in each subframe, and PRBs in each slot of the associated time-domain data).

In this exemplary embodiment, in the case of a RF-interface base station 116, a respective downlink analog RF signal for each downlink antenna port is received from the base station 116 and used to generate time-domain baseband IQ data for the slot for that downlink antenna port (for example, as described above in connection with FIGS. 1A-1D). In the case of a CPRI BBU 120, time-domain baseband IQ data for the various downlink antenna ports, formatted in accordance with the CPRI specifications, are received from the CPRI BBU 120. In both cases, a FFT process can be performed on the time-domain baseband IQ data for each downlink antenna port in order to produce frequency-domain baseband IQ data for the antenna port.

For each slot, the frequency-domain baseband IQ data for a symbol, e.g., the first or another symbol[3], of each downlink antenna port is used to determine a power level of each of at least one subcarrier of each PRB of the slot for the downlink antenna port. For example, for each downlink antenna port, the power level of each of the at least one subcarrier of each PRB of the slot can be determined for the symbol by summing a square of the in-phase (I) value and a square of the quadrature-phase (Q) value for the frequency-domain baseband IQ sample for that subcarrier for the symbol; alternate techniques may also be used. When a power level is determined for more than one subcarrier of a PRB for a given downlink antenna port, an aggregate power level for the PRB can be determined for the symbol by, for example, summing the respective power levels determined for the more than one subcarriers of the PRB. Whether a given PRB for a given slot and downlink antenna port is valid or not can be determined as a function of the respective power level for that PRB for the symbol. For example, a PRB is determined to be valid if the power level (or the aggregate power level if determined) for the symbol of that PRB is greater than a downlink power threshold level. The PRB is determined to be invalid if the power level (or the aggregate power level if determined) for the symbol of that PRB is not greater than the power threshold level. The downlink power threshold level may be determined by a DAS designer, a DAS manufacturer, and/or a DAS user, and may correspond to a power level that is highly correlated with situations where the associated PRB will contribute significant "signal" to corresponding downlink RF signal that is ultimately transmitted over the air (where "signal" is defined as used in the context of a SINR) and will not contribute just "noise" or "interference" (where "noise" and "interference" are defined as used in the context of a SINR). This processing is done for each antenna port of the associated base station 116 or CPRI BBU 120.

[3] Optionally, the other symbol is a symbol expected to include a demodulation reference signal.

For each downlink antenna port of the RF-interface base station 116 or CPRI BBU 120, control-plane data is generated that identifies which PRBs of the slot contain valid PRBs and corresponding user-plane data is generated that contains baseband IQ data for the valid PRBs of the slot. The resulting control-plane data and user-plane data is communicated over the DAS 100 to the RUs 106 in the simulcast zone of that RF-interface base station 116 or CPRI BBU 120. The control-plane data is used by any entity that receives the control-plane data in order to identify which PRBs of the slot the associated user-plane data corresponds to. The control-plane and user-plane data can be formatted in accordance with the O-RAN digital fronthaul interface standard.

In the exemplary embodiment described here in connection with FIG. 2, the time-domain data that would otherwise be communicated over the DAS 100 is instead converted to frequency-domain user-plane data and used to identify valid PRBs for transporting to the RUs 106. However, because there is additional latency involved with doing this conversion, in the embodiment shown in FIG. 2, for each slot, the time-domain data for the symbol, e.g., the first or another symbol[4], of the slot is communicated immediately over the DAS 100 to the RUs 106 in the simulcast zone of the base station 116 or CPRI BBU 120 (block 206) and, at the same time and in parallel, the processing described above in connection with blocks 204-210 is performed using the frequency-domain user-plane data for the symbol of each PRB to determine if that PRB is valid or not. If that PRB is not a valid PRB, then no additional data for that PRB is transported over the fronthaul to the RUs 106. Each RU 106 uses the downlink control-plane data received for the slot to determine which PRBs are valid and only uses the time-domain data for the symbol for valid PRBs in generating the downlink analog RF signals and discards the time-domain data for the symbol for invalid PRBs.

[4] Optionally, the other symbol is a symbol expected to include a demodulation reference signal.

Each RU 106 in the simulcast zone of each RF-interface base station 116 and CPRI BBU 120, for each slot, receives downlink control-plane and user-plane data for each downlink antenna port of the RF-interface base station 116 or CPRI BBU 120 (block 214), generates a downlink analog RF signal for each downlink antenna port using the received downlink control-plane and user-plane data for that downlink antenna port (block 216), and wirelessly transmitting the downlink analog RF signals for the downlink antenna ports from the coverage antennas 108 associated with the RU 106 (block 218). The received downlink control-plane and user-plane data for each downlink antenna port of the RF-interface base station 116 and CPRI BBU 120 can be used to generate a downlink analog RF signal for that downlink antenna port by using the downlink control-plane data to identify which PRBs the corresponding downlink user-plane data corresponds to and converting the downlink frequency-domain user-plane data to time-domain baseband IQ data (for example, by performing an IFFT process). The time-domain baseband IQ data for the valid PRBs is then used to generate respective downlink analog RF signals for the downlink antenna ports, and the downlink analog RF signals are radiated from respective coverage antennas 108 associated with the RU 106 (for example, as described above in connection with FIGS. 1A-1D).

Blocks 208-218 (and optionally block 204 and/or block 206) are repeated for each successive slot, i.e., are performed on a slot by slot basis.

Figure 3:
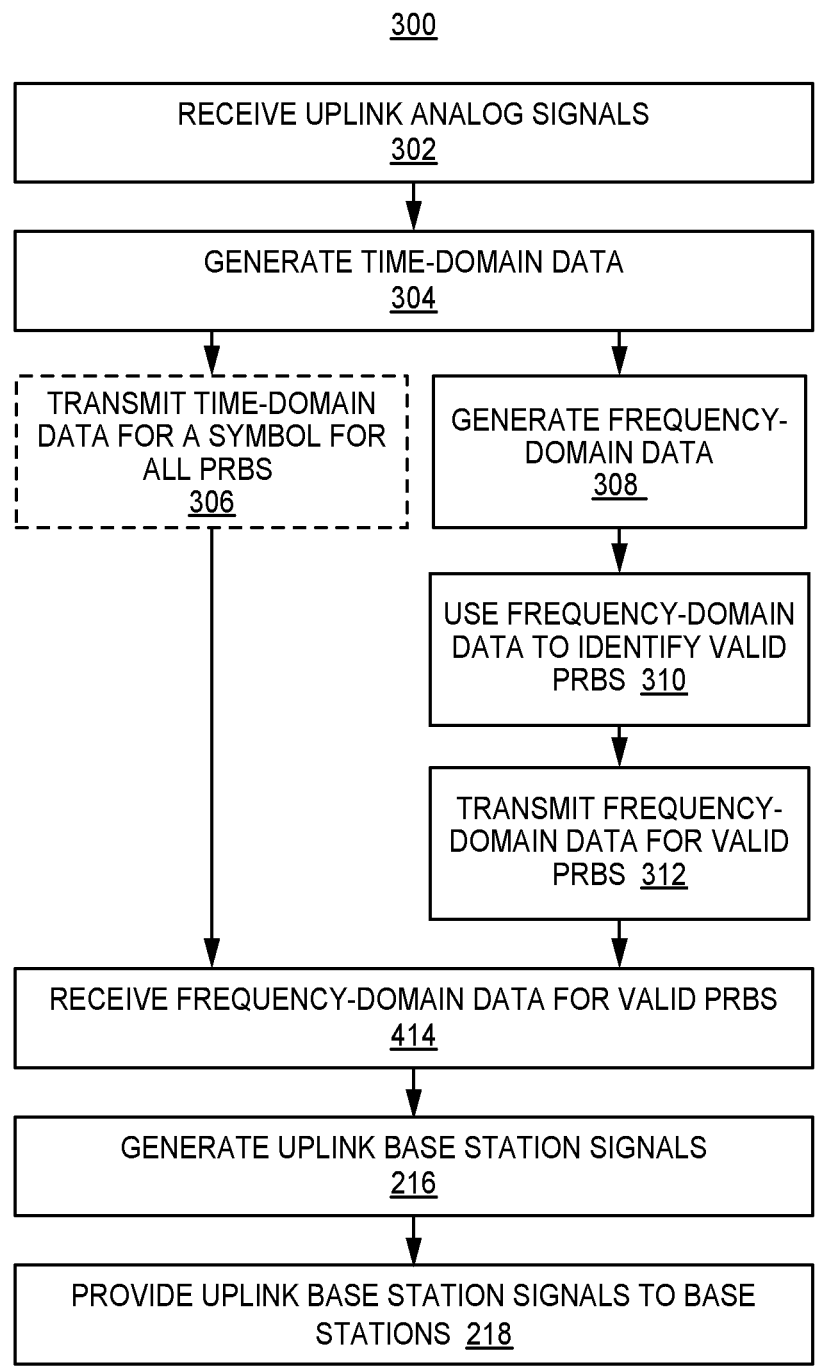
FIG. 3 comprises a high-level flowchart illustrating one exemplary embodiment of a method of performing selective muting in an uplink path of a distributed antenna system.

FIG. 3 comprises a high-level flowchart illustrating one exemplary embodiment of a method 300 of performing selective muting in an uplink path of a distributed antenna system.

The embodiment of method 300 shown in FIG. 3 is described here as being implemented using the DAS 100 described above in connection with FIGS. 1A-1D. However, it is to be understood that other embodiments can be implemented in other ways.

The blocks of the flow diagram shown in FIG. 3 have been arranged in a generally sequential manner for ease of explanation; however, it is to be understood that this arrangement is merely exemplary, and it should be recognized that the processing associated with method 300 (and the blocks shown in FIG. 3) can occur in a different order (for example, where at least some of the processing associated with the blocks is performed in parallel and/or in an event-driven manner). Also, most standard exception handling is not described for ease of explanation; however, it is to be understood that method 300 can and typically would include such exception handling. Moreover, one or more aspects of method 300 can be configurable or adaptive (either manually or in an automated manner).

Each RU 106 in the simulcast zone of a RF-interface base station 116 or CPRI BBU 120, for each slot, receives a respective RF signal for each uplink antenna port of that base station 116 or BBU 120 (block 302), generates time-domain baseband IQ data for each uplink antenna port for a slot (block 304), using the time-domain baseband IQ data for the slot, generates frequency-domain baseband IQ data for each uplink antenna port for that slot (block 308), uses the frequency-domain baseband IQ data for each uplink antenna port for that slot to identify valid PRBs for that slot (block 310), and transmits frequency-domain baseband IQ data for only the valid PRBs over the DAS 100 towards that base station 116 or BBU 120 (block 312). As noted above, the exemplary embodiment described here in connection with FIG. 2 is described here as being implemented using the DAS 100 described above in connection with FIGS. 1A-1C. As noted above, the DAS 100 described above in connection with FIGS. 1A-1C includes a master timing entity (for example, the master unit 130) that is synchronized to the time base used by the source base stations 102. This time base then can be used by the various entities in the DAS 100 to determine the slot-related timing for each base station 102 (for example, by determining a system frame number (SFN), at least one frame, at least one subframe (SF(s)) in each frame, at least one slot in each subframe, and PRBs in each slot of the associated time-domain data).

In this exemplary embodiment, each RU 106 in the simulcast zone of a RF-interface base station 116 or CPRI BBU 120, receives uplink RF analog signals received via the associated coverage antennas 108, low-noise amplifies each uplink RF analog signal, and, if necessary, filters and, if necessary, down-converts the resulting signal to produce an intermediate frequency (IF) or zero IF version of the signal. Each RU 106 converts the resulting analog signals to real or IQ digital samples and outputs them to the one or more programmable logical devices for uplink signal processing. (The analog-to-digital conversion process can be implemented using a direct RF ADC that can receive and digitize RF signals, in which case no analog down-conversion is necessary.) This uplink signal processing includes using the real or IQ digital samples in order to produce time-domain baseband IQ data for each uplink antenna port of the RF-interface base station 116 or CPRI BBU 120. A FFT process is performed on the time-domain baseband IQ data for each uplink antenna port in order to produce frequency-domain baseband IQ data for the antenna port.

For each slot, the frequency-domain baseband IQ data for a symbol, e.g., the first symbol or another symbol[5], of a slot of each uplink antenna port is used to determine a power level of each of at least one subcarrier of each PRB of the slot for the uplink antenna port. For example, for each uplink antenna port, the power level of each of the at least one subcarrier of each PRB of the slot can be determined for the symbol by summing a square of the in-phase (I) value and a square of the quadrature-phase (Q) value for the frequency-domain baseband IQ sample for that subcarrier for the symbol; alternate techniques may also be used. When a power level is determined for more than one subcarrier of a PRB for a given uplink antenna port, an aggregate power level for the PRB can be determined for the symbol by, for example, summing the respective power levels determined for the more than one subcarriers of the PRB. Whether a given PRB for a given slot and uplink antenna port is valid or not can be determined as a function of the respective power level for that PRB for the symbol. For example, a PRB is determined to be valid if the power level (or the aggregate power level if determined) for the symbol of that PRB is greater than an uplink power threshold level. The PRB is determined to be invalid if the power level (or the aggregate power level if determined) for the first of that PRB is not greater than the power threshold level. The uplink power threshold level may be determined by a DAS designer, a DAS manufacturer, and/or a DAS user, and may correspond to a power level that is highly correlated with situations where the associated PRB will contribute significant "signal" to corresponding uplink RF signal that is ultimately transmitted over the air (where "signal" is defined as used in the context of a SINR) and will not contribute just "noise" or "interference" (where "noise" and "interference" are defined as used in the context of a SINR). This processing is done for each antenna port of the associated base station 116 or CPRI BBU 120.

[5] Optionally, the other symbol is a symbol expected to include a demodulation reference signal.

For each uplink antenna port of the RF-interface base station 116 or CPRI BBU 120, control-plane data is generated that identifies which PRBs of the slot contain valid PRBs and corresponding user-plane data is generated that contains baseband IQ data for the valid PRBs of the slot. The resulting control-plane data and user-plane data is communicated over the DAS 100 northbound towards that RF-interface base station 116 or CPRI BBU 120. The control-plane data is used by any entity that receives the control-plane data in order to identify which PRBs of the slot the associated user-plane data corresponds to. The control-plane and user-plane data can be formatted in accordance with the O-RAN digital fronthaul interface standard.

In the exemplary embodiment described here in connection with FIG. 3, the time-domain data that would otherwise be communicated over the DAS 100 is instead converted to frequency-domain user-plane data and used to identify valid PRBs for transporting towards the base station 116 or CPRI BBU 120. However, because there is additional latency involved with doing this conversion, in the embodiment shown in FIG. 3, for each slot, the time-domain data for the symbol of the slot is communicated immediately over the DAS 100 towards the base station 116 or CPRI BBU 120 (block 306) and, at the same time and in parallel, the processing described above in connection with blocks 304-312 is performed using the frequency-domain user-plane data for the symbol of each PRB to determine if that PRB is valid or not. If that PRB is not a valid PRB, then no additional data for that PRB is transported over the fronthaul towards the base station 116 or CPRI BBU 120. Each donor unit 104 or main unit 130 uses the uplink control-plane data received for the slot to determine which PRBs are valid and only uses the time-domain data for the symbol for valid PRBs in generating the uplink analog RF signals or uplink CPRI data and discards the time-domain data for the symbol for invalid PRBs.

The control-plane and frequency-domain user-plane data for the RF-interface base station 116 or CPRI BBU 120 is used by any ICNs 112 receiving it to perform a summing or combining process in the same manner described above in connection with FIGS. 1A-1D for other transport data communicated as frequency-domain baseband IQ data.

The master unit 130 and/or donor unit 114 or 118 for each RF-interface base station 116 and CPRI BBU 120, for each slot, receives uplink control-plane and user-plane data for each uplink antenna port of the RF-interface base station 116 or CPRI BBU 120 sent from any southbound entities (block 314), generates a single combined base station signal or stream of time-domain baseband IQ data for each uplink antenna port using the received control-plane and user-plane data for that uplink antenna port (block 316), and provides the single combined base station signal or stream of time-domain baseband IQ data for each uplink antenna port to the RF-interface base station 116 or CPRI BBU 120 (block 318). The received uplink control-plane and user-plane data for each uplink antenna port of the RF-interface base station 116 and CPRI BBU 120 can be used to generate the single combined base station signal or stream of time-domain baseband IQ data for that uplink antenna port by first performing a combing or summing process, using the uplink control-plane data to identify which PRBs the associated user-plane data corresponds to and combing or summing the user-plane data received from the various southbound entities, in the same manner described above in connection with FIGS. 1A-1D. Then, the resulting combined frequency-domain user-plane data for each uplink antenna port is then converted to time-domain baseband IQ data (for example, by performing an IFFT process). In the case of a RF-interface base station 116, the resulting time-domain baseband IQ data for each uplink antenna port is used to generate a corresponding uplink analog RF signal for that antenna port (for example, as described above in connection with FIGS. 1A-1D), which is output to a respective port of the RF-interface base station 116. In the case of a CPRI BBU 120, the resulting streams of time-domain baseband IQ data for the various uplink antenna ports are formatted in accordance with the CPRI specifications and provided to the CPRI BBU 120.

Blocks 304, and 308-318 (and optionally block 306) are repeated for each successive slot, i.e., are performed on a slot by slot basis.

Techniques are disclosed for converting, in a DAS, between time-domain digital data (which is not O-RAN compliant) and frequency-domain digital data in an O-RAN compliant packet format. The data in the O-RAN compliant packet format includes (a) user-plane data and control plane data used to convey and identify the frequency- or time-domain data, and (b) management plane data used to perform management functions, such as uplink muting. The control plane data may be utilized to identify physical resource blocks, e.g., in a transmission time interval (TTI), associated with blocks of time-domain or frequency-domain data conveyed in the user-plane data.

Because the data in the O-RAN compliant packet format is packetized, O-RAN compliant packets may be communicated point-to-multipoint. Thus, optionally, a fronthaul interface, communicatively coupling a master unit and each RU may be cost effectively communicatively coupled through a switched Ethernet network. The switched Ethernet network my include one or more Ethernet switches and Ethernet cable(s). Use of O-RAN compliant packets utilizing frequency-domain digital data diminishes data bandwidth used in the fronthaul interface communicatively coupling the master unit and each RU.

Figure 4:
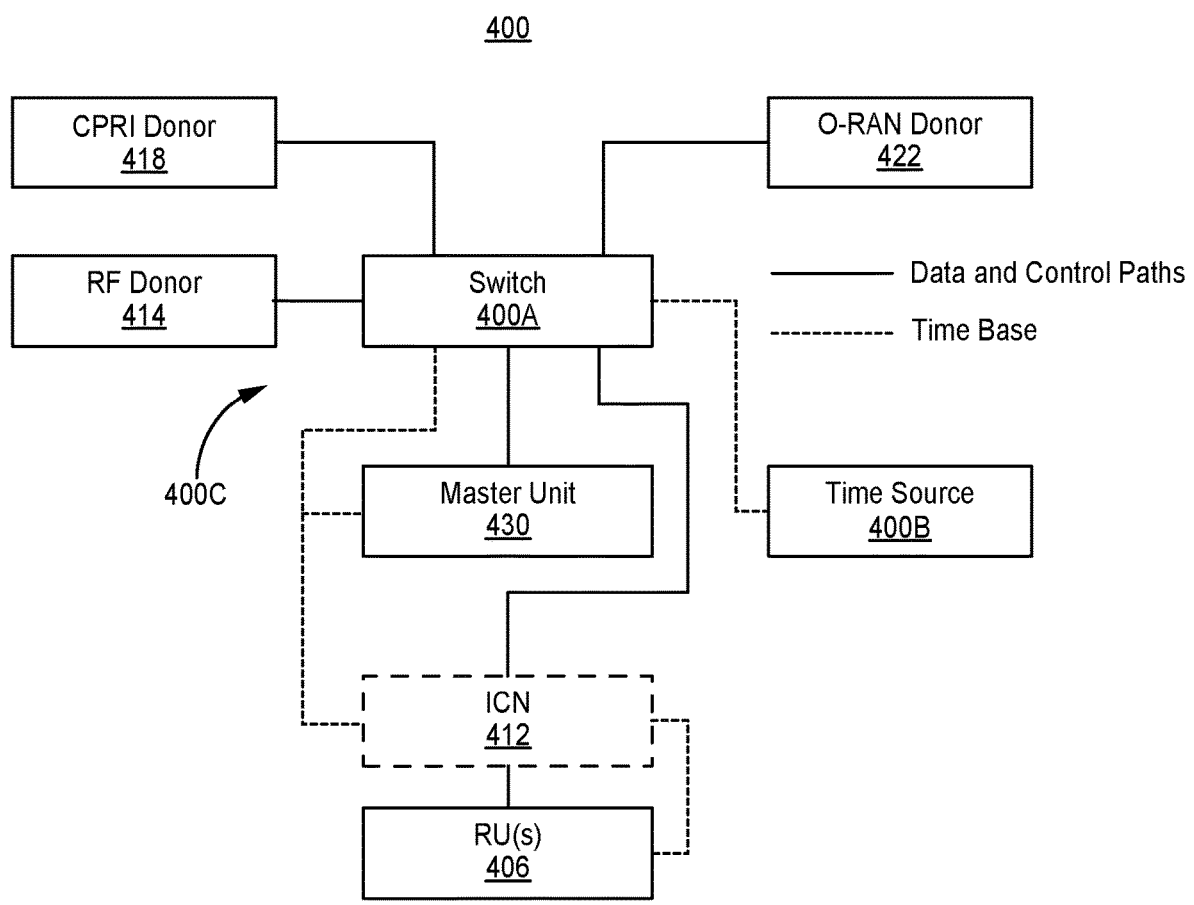
FIG. 4 illustrates a block diagram of one embodiment of a DAS configured to convert time-domain digital data to frequency-domain digital data utilizing an O-RAN compliant packet format, and transport the digital data using the O-RAN compliant packet format in an Ethernet network.

FIG. 4 illustrates a block diagram of one embodiment of a DAS 400 configured to convert non-O-RAN compliant, time-domain digital data to frequency-domain digital data utilizing an O-RAN compliant packet format, and transport the digital data using the O-RAN compliant packet format in an Ethernet network. The digital data using the O-RAN compliant packet format is transported in an Ethernet network of the DAS. The digital data may be time-domain or frequency-domain digital data. Although only RF-interface base stations and CPRI BBUs are illustrated with respect to FIGS. 1A-D and 4 as base stations which are not O-RAN compliant, embodiments of the invention are applicable to other base stations, e.g., eCPRI BBUs, which are not O-RAN compliant—and their corresponding donors.

The components of FIG. 4, to the extent described in FIGS. 1A-1D, function as described in those figures. The DAS 400 comprises an RF donor 414 and/or a CPRI donor 418, an O-RAN donor 422, a master unit 430, a switch 400A, a time source 400B, at least one radio unit (RU(s)) 406, and optionally a ICN 412. Optionally, the switch 400A is an Ethernet switch. FIG. 4 illustrates exemplary data and control paths between components of the DAS 400.

The time source 400B is configured to provide a time base to the DAS 400 used by an RF-interface base station configured to be communicatively coupled to the RF donor 414. The O-RAN donor 422 is configured to provide to a DU and receive from the DU time- or frequency-domain digital data in a packet format which is O-RAN specification compliant.

The O-RAN compliant packets are illustrated as including frequency-domain data digital. However, if time-, rather than frequency-, domain data is included in the O-RAN compliant packets, then the frequency and inverse frequency transforms described herein are not needed; however, the control plane data corresponding to user-plane data comprising the frequency-domain data specifies each physical resource block in a TTI. Optionally, O-RAN compliant packets including frequency-domain data may be conveyed in an uplink or a downlink path between RU(s) 406 and the master unit 430, and O-RAN compliant packets including time domain data may be conveyed in an opposite path, i.e., respectively the downlink or the uplink path.

When the O-RAN compliant packets include frequency-domain digital data, then the master unit 430 provides (a) time-domain to frequency-domain conversion for the downlink time-domain digital data received from one or both of each of the RF donor 414 and the CPRI donor 418 and (b) frequency-domain to time-domain conversion for the uplink frequency-domain digital data received by the master unit 430 in O-RAN compliant packets. Each of the RF donor 414 and the CPRI donor 418 may each be referred to as a time-domain data interface (or a time-domain data interface circuit).

The time source 400B may utilize a precision time protocol (PTP), network time protocol (NTP), or another time protocol. Optionally, the time source 400B is a grand master clock, e.g., implemented by a global navigation satellite system (for example a Global Positioning Satellite system) receiver. For pedagogical purposes, the time source 400B is communicatively coupled to the switch 400A and is configured to provide the time base to the switch 400A.

The switch 400A is part of a switched Ethernet network 400C. The switch 400A is communicatively coupled to the RF donor 414, the CPRI donor 418, the O-RAN donor 422, the master unit 430, and the RU(s) 406. Optionally, the switch 400A is communicatively coupled to the RU(s) 406 through an optional ICN 412.

The switch 400A is configured to distribute the time base from the time source 400B and to components of the DAS 400 communicatively coupled to the switch 400A. FIG. 4 illustrates exemplary paths for distribution of a time base; other paths for distributing the time base from time source 400B and to the components of the DAS 400 may be used. For example, in the absence of the ICN 412, data and control paths are between the master unit 430 and the RU(s) 406. The time base is also coupled between the master unit 430 and the RU(s) 406.

The data and control paths illustrated between the master unit 430 and the RU(s) 406 convey O-RAN user, control, and management plane data. Each such O-RAN user, control, and management plane data may be communicated in an O-RAN message. Optionally, to the extent the processing activity is described herein as being performed by a master unit 130, 430, such processing activity is executed by a processing circuit in the master unit 130, 430 or in a physical server which executes a VNF for the master unit 130, 430.

In this exemplary embodiment, a "common" or "unified" fronthaul interface is used for communications between the master unit 430 and the RU(s) 406 of the DAS 400. More specifically, in this exemplary embodiment, the O-RAN fronthaul interface uses a functional split 7.2 architecture. Also, in this exemplary embodiment, the O-RAN fronthaul interface is used for transport of control-plane data, user-plane data (using a functional split 7.2 architecture), synchronization-plane data (also referred to here as "timing" or "time base"), and management-plane data communications for the DAS.

The master unit 430 is configured to receive from and to provide to, time-domain data interface(s), time-domain digital data. Optionally, such time-domain digital data may be in the form of a packet, e.g., an Internet Protocol (IP) packet, or a frame, e.g., an Ethernet frame, comprising the packet.

When the O-RAN compliant packets include frequency-domain digital data, then the master unit 430 is configured to convert such time-domain digital data into frequency-domain digital data in a format used by the fronthaul interface, e.g., an O-RAN compliant fronthaul interface, for example using the functional split 7.2 architecture. In particular, where an RF-interface base station 116 or a CPRI BBU 120 is coupled to the DAS 400 through respectively the RF donor 414 or the CPRI donor 418, the master unit 430 receives the digital time-domain downlink data for an antenna port of respectively the RF-interface base station 116 or the CPRI BBU 120 and converts the time-domain digital data to frequency-domain digital data (by, for example, performing a fast Fourier transform (FFT) process on the time-domain digital downlink data) and generating corresponding control-plane data (for example, control-plane data that indicates that all physical resource blocks (PRBs) for all sub-carriers are being communicated via corresponding user-plane data communications).

Figure 5:
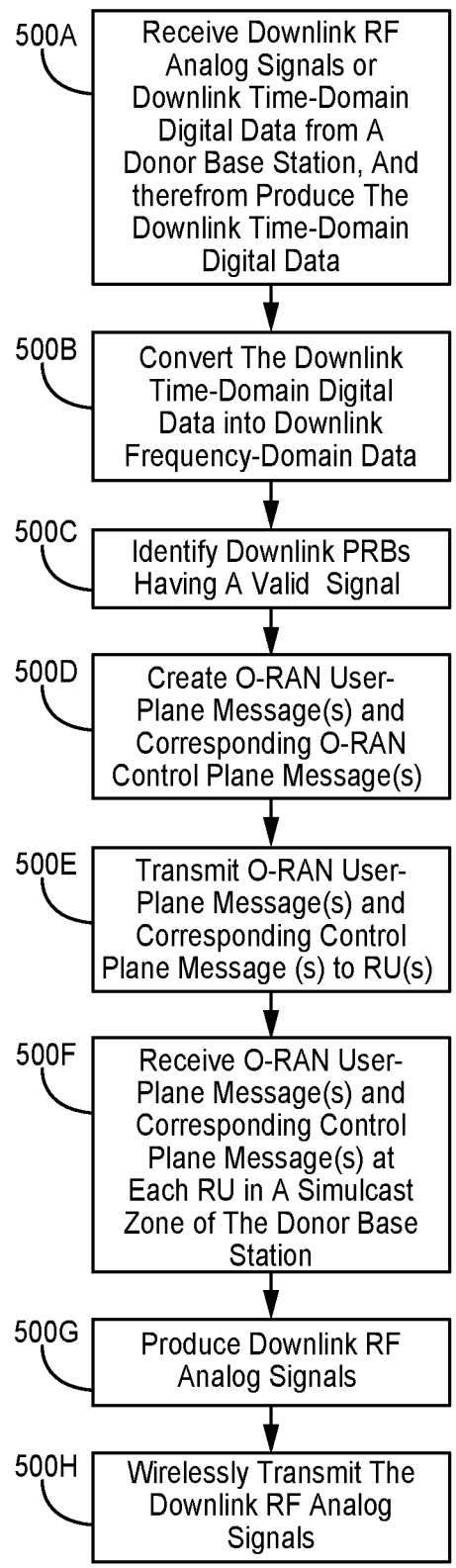
FIG. 5 illustrates a flowchart of one exemplary embodiment of a method of communicating downlink time-domain digital data, produced base station that is not O-RAN compliant, as frequency-domain data.

FIG. 5 illustrates a flowchart of one exemplary embodiment of a method 500 of communicating downlink time-domain digital data, produced base station that is not O-RAN compliant, as frequency-domain data. The embodiment of method 500 shown in FIG. 5 may be implemented using the DASs 100, 400 described herein. Thus, for example, a CPRI donor and/or an RF donor 114 may be directly communicatively coupled to a master unit 130 or indirectly coupled to the master unit though another donor or an Ethernet network, e.g., a switched Ethernet network 134. However, it is to be understood that other embodiments can be implemented in other ways. Optionally, the method 500 is executed by a master unit, but alternatively may be performed by another component of the DAS or external to the DAS. For pedagogical purposes, method 500 is described with respect to the DASs 100, 400 illustrated in FIGS. 1A-D and 4. Further, although only RF-interface base stations and CPRI BBUs are illustrated herein with respect to FIGS. 5 and 6 as base stations which are not O-RAN compliant, embodiments of the invention are applicable to other base stations, e.g., eCPRI BBUs, which are not O-RAN compliant—and their corresponding donors.

The blocks of the flow diagram shown in FIG. 5 have been arranged in a generally sequential manner for ease of explanation; however, it is to be understood that this arrangement is merely exemplary, and it should be recognized that the processing associated with method 500 (and the blocks shown in FIG. 5) can occur in a different order (for example, where at least some of the processing associated with the blocks is performed in parallel and/or in an event-driven manner). Also, most standard exception handling is not described for ease of explanation; however, it is to be understood that method 500 can and typically would include such exception handling. Moreover, one or more aspects of method 500 can be configurable or adaptive (either manually or in an automated manner).

In block 500A, receive downlink RF analog signals or downlink time-domain digital data including downlink IQ data from a donor base station 102 via an appropriate donor unit 104 of the DAS 100 and therefrom produces time-domain baseband digital data (or downlink time-domain digital data). Such received downlink RF analog signals and downlink time-domain digital data include IQ data. Some of the details regarding how base station signals or data are received from the donor base station 102 vary based on which type of base station 102 is being served. In the case of an RF-interface base station 116, the associated RF donor unit 114, 414, receives analog downlink RF signals from the RF-interface base station 116 and, either alone or in combination with one or more other units, e.g., the master unit 130, 430 of the DAS 100, 400, converts the received analog downlink RF signals to time-domain baseband data (for example, by digitizing, digitally down-converting, and filtering the received analog downlink RF signals in order to produce digital time-domain baseband IQ data (or downlink time-domain digital data)). In the case of a CPRI BBU 120, the associated CPRI digital donor unit 118 receives CPRI downlink fronthaul data from the CPRI BBU 120 and, either alone or in combination with another unit of the DAS 100, extracts the downlink time-domain baseband IQ data (or downlink time-domain digital data). Optionally, the downlink time-domain digital data is transmitted, e.g., from the donor unit 104 to the master unit 130, 430.

In block 500B, the downlink time-domain digital data is converted into downlink frequency-domain digital data. The downlink frequency-domain digital data includes baseband IQ data (or IQ data). For example, the appropriate donor unit 104 (or another component of the DAS 100, e.g., the master unit 130, 430) can use a fast Fourier transform (FFT) or other time-domain-to-frequency-domain transform to convert the downlink time-domain baseband IQ data for each slot to corresponding downlink frequency-domain baseband IQ data (or downlink frequency-domain digital data).

In block 500C, downlink PRBs in a slot having a meaningful (or valid) received signal and include downlink IQ data from the donor base station identified. Valid received signal, as used herein, means that a PRB (or portion thereof) satisfies predetermined one or more signal criterion. Optionally, a valid received signal is determined by determining whether a signal reception metric of an uplink PRB, e.g., a received signal strength indicator (RSSI) for the uplink PRB, exceeds a predetermined threshold level. Optionally, the signal reception metric may be performed on all or a portion, e.g., one symbol, of each uplink PRB. However, a valid received signal can be determined in other ways. Optionally, block 500C is performed by an appropriate donor unit 104 (or another component of the DAS 100, e.g., the master unit 130, 430).

In block 500D, for each slot, at least one downlink O-RAN user-plane message, comprising the frequency-domain baseband IQ data including only the downlink PRBs of a slot having a valid received signal, and corresponding at least one downlink control plane message are created. Optionally, the at least one downlink O-RAN user-plane message, comprising the frequency-domain baseband IQ data, and the corresponding at least one downlink control plane message are created in a donor unit 104 or another component of the DAS 100, 400, e.g., the master unit 130, 430. The downlink user-plane messages are created in order to communicate the downlink frequency-domain baseband IQ data for each slot. In this example, frequency-domain baseband IQ data is generated for all of the physical resource blocks (PRBs) of each slot and communicated in O-RAN downlink user-plane messages. Therefore, the O-RAN downlink user-plane messages that are created for each slot are used to communicate downlink frequency-domain digital data for every PRB of the slot; the corresponding O-RAN downlink control-plane messages that are created for each slot indicate the frequency-domain baseband IQ data for every PRB of the slot being communicated in the corresponding O-RAN downlink user-plane messages for that slot.

In block 500E, for each slot, the at least one downlink O-RAN user-plane message, comprising the frequency-domain baseband IQ data for the slot, and the corresponding at least one downlink O-RAN control plane message are transmitted (e.g., by the donor unit 104 or another component of the DAS 100, 400, e.g., the master unit 130, 430) to each RU of the at least one RU 106, 406 in a simulcast zone of the donor base station 102. In this example, the O-RAN downlink user-plane and control-plane messages are communicated via the DAS 100 in the same general manner that O-RAN downlink user-plane and control-plane messages are communicated for O-RAN donor base stations 102 (that is, for O-RAN DUs 124). Optionally, the at least one downlink O-RAN user-plane message for each slot, comprising the frequency-domain baseband IQ data for the slot, and the corresponding at least one downlink O-RAN control plane message for each slot are conveyed to each RU of the at least one RU 106, 406 in a simulcast zone of the donor base station 102 through at least one of an ICN 112, 412 and an Ethernet network, e.g., a point to point Ethernet network or a switched Ethernet network 134.

In block 500F, each RU, of the at least one RU 106, 406, in a simulcast zone of the donor base station 102 receives the at least one downlink user-plane message including the downlink IQ data generated by the donor base station 102, and the at least one control-plane message. In block 500G, each RU, of the at least one RU 106, 406, in the simulcast zone of the donor base station 102, uses the received messages to produce a set of downlink RF analog signals including the IQ data. In block 500H, each RU, of the at least one RU 106, 406, in the simulcast zone of the donor base station 102, wirelessly transmits the set of downlink RF analog signals including the downlink IQ data, e.g., to one or more user equipment 110 and from the respective set of coverage antennas 108 associated with that RU 106. In this example, each RU 106 does this in the same general manner that it does for O-RAN downlink user-plane and control-plane messages that are communicated for O-RAN donor base stations 102 (that is, for O-RAN DUS 124).

Figure 6:
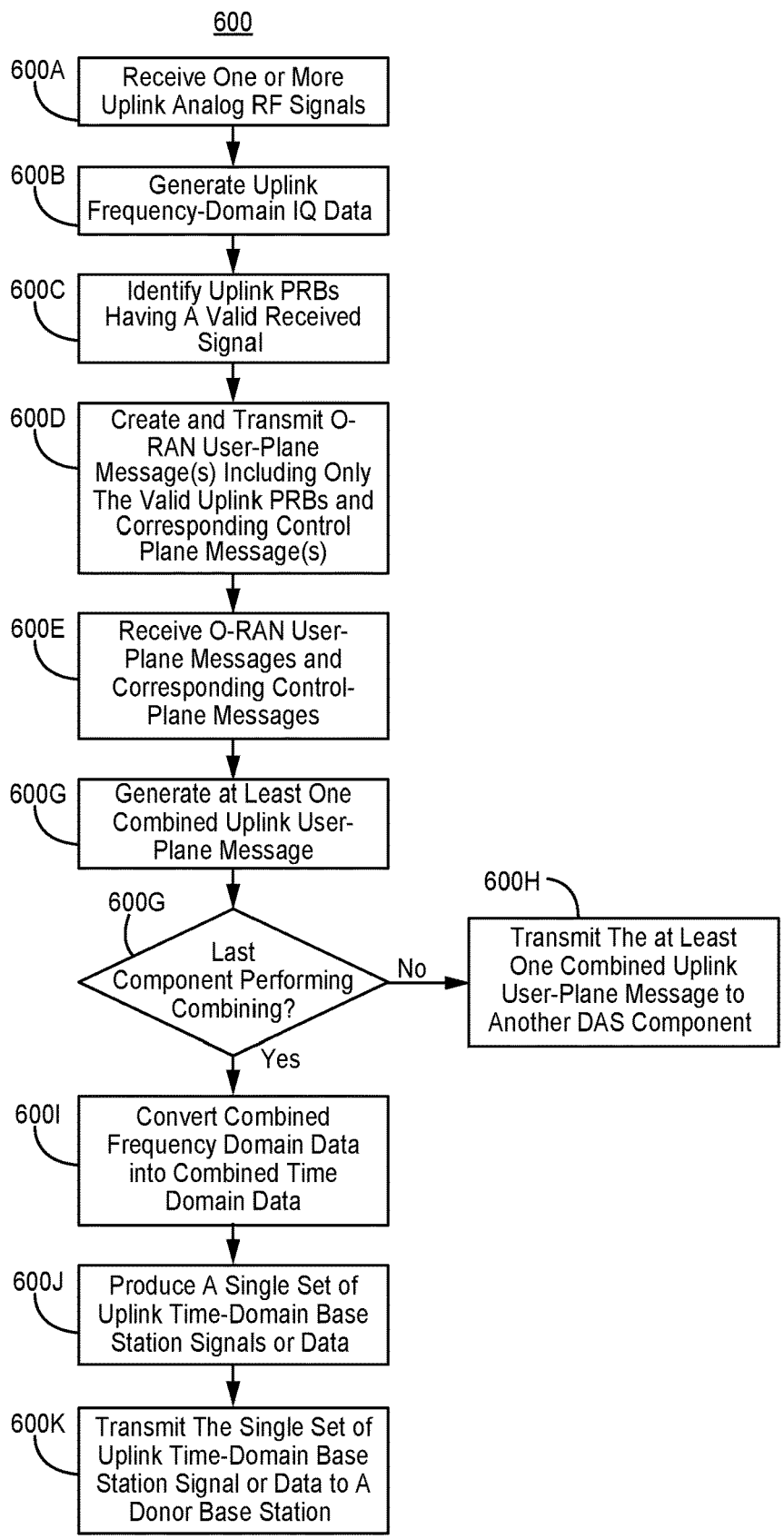
FIG. 6 illustrates a flowchart of one exemplary embodiment of a method of transforming, in a distributed antenna system, uplink frequency-domain data transmitted with O-RAN user-plane and corresponding O-RAN control-plane messages to uplink time-domain data.

FIG. 6 illustrates a flowchart of one exemplary embodiment of a method of transforming, in a distributed antenna system 100, 400, uplink frequency-domain data transmitted with O-RAN user-plane and corresponding O-RAN control-plane messages to uplink time-domain data. The embodiment of method 600 shown in FIG. 6 is described here may be implemented using the DASs 100, 400 described herein. Thus, for example, a CPRI donor and/or an RF donor 114 may be directly communicatively coupled to a master unit 130 or indirectly coupled to the master unit though another donor or an Ethernet network, e.g., a switched Ethernet network 134. However, it is to be understood that other embodiments can be implemented in other ways. For example, the illustrated techniques described here can be used in a non-virtualized DAS. Optionally, the method is executed by a radio unit, but alternatively may be performed by another component of the DAS or external to the DAS. For pedagogical purposes, method 300 is described with respect to the DASs 100, 400 illustrated in FIGS. 1A-D and 4.

The blocks of the flow diagram shown in FIG. 6 have been arranged in a generally sequential manner for ease of explanation; however, it is to be understood that this arrangement is merely exemplary, and it should be recognized that the processing associated with method 600 (and the blocks shown in FIG. 6) can occur in a different order (for example, where at least some of the processing associated with the blocks is performed in parallel and/or in an event-driven manner). Also, most standard exception handling is not described for ease of explanation; however, it is to be understood that method 600 can and typically would include such exception handling. Moreover, one or more aspects of method 600 can be configurable or adaptive (either manually or in an automated manner).

As noted above, for each base station 102 served by a given RU 106, the RU 106 is configured to receive one or more uplink radio frequency signals transmitted from the user equipment 110 served by that base station 102. These signals are analog radio frequency signals and are received, e.g., through the set of coverage antennas 108, associated with that RU 106. Thus, in block 600A, an RU, in the simulcast zone of a donor base station 102, wirelessly receives one or more uplink analog RF signals. In block 600B, the RU in the simulcast zone of a donor base station 102 generates uplink frequency-domain baseband IQ data derived from one or more uplink analog RF signals received, e.g., through a set of coverage antennas 108, for that served time-domain base station 102 at that RU 106. In the illustrated example, the uplink frequency-domain baseband IQ data is communicated in O-RAN uplink user-plane messages, and are identified in O-RAN uplink control plane messages. Except as explained elsewhere herein, each RU 106 generates uplink frequency-domain baseband IQ data and transmits the uplink frequency-domain baseband IQ data in O-RAN uplink user-plane messages in the same general manner that it does for O-RAN uplink user-plane messages that are communicated to O-RAN donor base stations 102 (that is, for O-RAN DUs 124).

In block 600C, the RU, in the simulcast zone of the donor base station 102, identifies uplink PRBs in a slot having a meaningful (or valid) received signal and include uplink IQ data from the donor base station. Valid received signal, as used herein, means that a PRB (or portion thereof) satisfies predetermined one or more signal criterion. Optionally, a valid received signal is determined by determining whether a signal reception metric of an uplink PRB, e.g., a received signal strength indicator (RSSI) for the uplink PRB, exceeds a predetermined threshold level. Optionally, the signal reception metric may be performed on all or a portion, e.g., one symbol, of each uplink PRB. However, a valid received signal can be determined in other ways.

In block 600D, the RU, in the simulcast zone of the donor base station 102, creates and then transmits at least one O-RAN uplink user-plane message including only uplink PRBs of a slot having a valid received signal and at least one corresponding O-RAN uplink user-plane message northbound towards the donor unit 104 communicatively coupled to that donor base station 102. Through each of the at least one corresponding O-RAN uplink control-plane message, the RU 106 identifies, to another northbound component of the DAS 100, 400 to which RU is communicatively coupled, the valid uplink PRBs of the slot in such at least one O-RAN uplink user-plane message. Each O-RAN uplink control-plane message uses a same format as an O-RAN uplink control-plane message used for identifying uplink PRBs in an O-RAN-uplink user-plane message which a receiving entity should expect to receive from an O-RAN compliant radio (O-RU). Except as explained elsewhere herein, each RU 106 generates uplink frequency-domain baseband IQ data and transmits the uplink frequency-domain baseband IQ data in O-RAN uplink user-plane messages in the same general manner that an O-RU does for O-RAN donor base station(s) 102 (that is, for O-RAN DU(s) 124). By conveying only PRBs having a received meaningful (or a valid) signal, fronthaul transport bandwidth is diminished.

The at least one uplink user-plane message, including the uplink frequency-domain baseband IQ data, and the corresponding at least one uplink control plane message are transmitted from the RU (in the simulcast zone of the donor base station 102) to donor base station 102 through at least one other DAS component (e.g., other RU(s), ICN(s) 112, 412, a master unit 130, 430, and/a donor unit 104) which is configured to perform a combining or summing process. One or more of the at least one other DAS component may be communicatively coupled through an Ethernet network, e.g., a point to point Ethernet network or a switched Ethernet network 134.

In the uplink path, the combining or the summing process is performed by at least one DAS component (e.g., RU(s) 106, 406, ICN(s) 112, 412, a master unit 130, 430, and/or a donor unit 104) for each donor base station 102. The combining or summing process can be performed in a centralized manner in which the combining or summing process is performed by a single component of the DAS 100, 400 (for example, a donor unit 104 or the master unit 130, 430) or in a distributed or hierarchical manner in which the combining or summing process is performed by multiple components of the DAS 100, 400 (for example, a donor unit 104 (or the master unit 130, 430) and one or more ICNs 112 and/or RUs).

In block 600E, a component of the DAS 100, 400 receives user-plane messages, and optionally corresponding control plane messages, (e.g., from the RU or another component of the DAS northbound from the RU and communicatively coupled to the RU) and at least one other component of the DAS 100, 400 that is southbound of and communicatively coupled to the component. In block 600F, using the user-plane messages, and optionally using the optional corresponding control plane messages, received in block 600E, the component of the DAS 100, 400 generates at least one combined uplink user-plane message, including combined uplink frequency-domain baseband IQ data for a slot of the more than one southbound component, and an optional corresponding at least one combined control plane message identifying valid PRBs in each of the at least one combined uplink user-plane message. The at least one combined uplink user-plane message includes combined uplink user-plane IQ data for a slot from the RU and for the at least one other component (e.g., one or more other RUs) of the DAS 100, 400 that is southbound of and communicatively coupled to the component. The process of block 600F may also be referred to herein as the combining or summing process.

In block 600G, whether the component of the DAS 100, 400 is the last component performing the combining or summing process of block 600F (in a northbound path between the RU and the donor base station 102 and each of which is specified in blocks 600A and 600B) is determined. If the component performing the combining or summing process is not the last unit performing the combining or summing process in that northbound path (that is, if there is another component of the DAS 100, 400 to which that component of block 600F communicates the combined uplink user-plane baseband IQ data of a slot), then, in block 600H, the component communicates the combined frequency-domain baseband IQ data of the slot in the at least one combined uplink user-plane message (and, optionally, the corresponding at uplink control-plane messages identifying valid PRBs in the combined frequency-domain baseband IQ data of the slot communicated in the uplink user-plane messages) northbound towards the donor unit 104 coupled to that donor base station 102 and to another component of the DAS which performs the combining process. Optionally, the combined frequency-domain baseband IQ data of the slot comprises only valid PRBs in the slot. After block 600H, proceed to block 600E. Otherwise, if the unit performing the combining or summing process is the last unit performing the combining or summing process, that method 600 proceeds to block 600I.

At block 600I, the combined frequency-domain baseband IQ data for the slot is converted to combined time-domain baseband IQ data. Optionally, the combined frequency-domain baseband IQ data includes only valid PRBs in the slot and uplink IQ data from the at least one UE. For example, the appropriate donor unit 104 (or other unit of the DAS 100, e.g., the master unit 130, 430) performs an inverse fast Fourier transform (iFFT) or other frequency-domain-to-time-domain transform on the combined frequency-domain baseband IQ data for a slot in order to convert the frequency-domain baseband IQ data for the slot to corresponding time-domain baseband IQ data for the slot.

In block 600J, the combined time-domain baseband IQ data for each RF-interface and time domain digital donor base station 102 is used to produce a single set of uplink time-domain base station signals or data. The single set of uplink time-domain base station signals or data may be uplink analog RF time-domain base station signals configured to be received by an RF-interface base station 116 or uplink digital time-domain base station digital signals, e.g., in a CPRI, eCPRI, or another format, configured to be received by a baseband unit, e.g., a CPRI BBU 120, an eCPRI BBU, or another type of BBU.

In block 600K, the single set of uplink time-domain base station signals or data is communicated to the donor base station 102. Some of the details regarding how set of uplink time-domain base station signals or data are produced vary based on which type of base station 102 is being served. In the case of an RF-interface base station 116, the set of uplink time-domain base station signals comprises a set of uplink analog RF signals that are generated from the uplink time-domain baseband IQ data (for example, by performing one or more of the following using the uplink time-domain baseband IQ data as an input: filtering, digitally up-converting, digital-to-analog converting, and frequency converting). The resulting set of uplink analog RF signals is output to the RF-interface base station 116. In the case of a CPRI BBU 120, the set of uplink time-domain base station signals comprises CPRI frames that are generated from the uplink time-domain baseband IQ data (for example, by formatting, and including, the uplink time-domain baseband IQ data for and in CPRI frames). The resulting CPRI frames are communicated to the CPRI BBU 120.

One exemplary embodiment of the invention configured to practice methods 500 and/or 600, will now be described. The exemplary embodiment of the invention may be implemented according to one of the DASs 100, 400 described with respect to FIGS. 1A-2 and/or performed in accordance with method 500 and/or method 600. However, other embodiments may be used having different parameter values and/or may be implemented with other DAS implementations and/or methods. In the one exemplary embodiment, a donor base station 102 (e.g., a RF-interface base station 116 or a CPRI BBU 120) is configured to support 100 MHz of carrier bandwidth, 273 PRBs per slot, a FFT/inverse FFT (iFFT) size of 4096, 4 bytes of IQ data per symbol (that is, a 16-bit I value and a 16-bit Q sample for each symbol), 8 bits per byte, 14 symbols per slot, and 2000 slots per second (that is, for a 0.5 millisecond slot duration). In such an exemplary embodiment, approximately 4 Gigabits-per-second (Gbps) of time-domain data is communicated in each direction for each antenna port between the master unit 130, 430 and the corresponding RF donor 114, 414 or the CPRI donor 118, 418. That is, for each antenna port, the amount of data communicated in each direction is represented as: 4096*4 bytes*8 bits per byte*14 symbols per slot*2000 slots per second or approximately 4 GBps. If four antenna ports are used for each direction for such a donor base station 102, approximately 16 Gbps of time-domain data is communicated in each direction for each antenna port between the master unit and the corresponding RF donor 114, 414 or CPRI donor 118, 418.

Although, for pedagogical purposes, conversion between time and frequency domain data may be illustrated as occurring in the master unit 130, 430, such processing can alternatively occur in, e.g., a processing circuit of, each time domain data interface (e.g., the RF donor 114, 414 and/or the CPRI donor 118, 418) of the DAS 100, 400. In such a case, to facilitate multicasting, each time domain data interface of the DAS 100, 400 would have to be provisioned with IP addresses of each multicast zone of the DAS 100, 400.

In such an example, in the downlink direction, the master unit 130, 430 generates one or more downlink O-RAN control-plane messages for each downlink slot (or transmission time interval (TTI)) that indicates that the corresponding O-RAN user-plane messages for that downlink slot will include all PRBs for a carrier (that is, will include 273 PRBs for a carrier bandwidth of 100 MHZ) for each support antenna port and indicate, for example, whether or not compression will be used for IQ data communicated via the corresponding O-RAN user-plane messages for that downlink slot and what transport mode will be used for communicating the corresponding O-RAN user-plane messages for that downlink slot. The master unit 130, 430 is configured to communicate these downlink O-RAN control-plane messages to all of the RU(s) 106, 406 of the DAS 100, 400 serving an associated donor base station 102. The downlink O-RAN control-plane messages can also be communicated to any other DAS nodes or components that will be receiving the corresponding O-RAN user-plane messages for that downlink slot. The master unit 130, 430 generates, for each downlink slot (or TTI), the corresponding O-RAN user-plane messages for each antenna port by converting the corresponding time-domain IQ samples for that slot to corresponding frequency-domain IQ samples for all PRBs for the carrier. That is, frequency-domain IQ samples for all 273 PRBs for a carrier bandwidth of 100 MHz) by, for example, performing an FFT process (for example, a 4096-point FFT) on the time-domain samples. This is done on a symbol-by-symbol basis. Post FFT, the master unit 130, 430 validates the IQ samples and assigns them appropriate PRB indexes. The master unit 130, 430 can synchronize itself to a frame boundary used by the corresponding donor base station, for example, using a protocol specific preamble/pilot signal correlation process (for example, by correlating to known timing schemes). The resulting frequency-domain IQ samples are compressed if, and in the manner, indicated in the corresponding O-RAN control-plane messages. The resulting frequency-domain IQ samples for the 273 PRBs will be communicated in one or more O-RAN user-plane messages on a symbol-by-symbol basis (for example, using an appropriate O-RAN section extension) and communicated over the fronthaul to the various RUs serving the donor base station 102 in the symbol duration time with minimal latency. The O-RAN user-plane messages are communicated, for example, using the transport mode indicated in the corresponding O-RAN control-plane messages. Each RU uses the O-RAN user-plane data to generate corresponding analog RF signals for radiation from antennas associated with that RU. The O-RAN user-plane messages can be communicated to other nodes of the DAS 100, 400 (for example, to an ICN 112, 412 or front haul multiplexer (FHM) that forwards or replicates messages).

Likewise, in the uplink direction, each of the RUs serving the associated donor base station generates one or more uplink O-RAN control-plane messages for each uplink slot (or TTI) that indicates that the corresponding O-RAN user-plane messages for that uplink slot will include all PRBs for a carrier (that is, will include 273 PRBs for a carrier bandwidth of 100 MHZ) and indicate, for example, whether or not compression will be used for IQ data communicated via the corresponding O-RAN user-plane messages for that uplink slot and what transport mode will be used for communicating the corresponding O-RAN user-plane messages for that uplink slot. Each remote unit will communicate these uplink O-RAN control-plane messages to the master unit 130, 430 of the DAS 100, 400 that will be serving the associated donor base station. The uplink O-RAN control-plane messages can also be communicated to any other nodes of the DAS 100, 400 that will be receiving the corresponding O-RAN user-plane messages for that uplink slot (for example, any ICN 112, 412 that is performing summing or combining for the corresponding O-RAN user-plane messages). Each RU serving the corresponding donor base station generates, for each uplink slot (or TTI), the corresponding O-RAN user-plane messages for each antenna port by converting the corresponding time-domain IQ samples for that slot to corresponding frequency-domain IQ samples for all PRBs for the carrier (that is, frequency-domain IQ samples for all 273 PRBs for a carrier bandwidth of 100 MHZ) by, for example, performing an FFT process (for example, a 4096-point FFT) on the time-domain samples. This is done on a symbol-by-symbol basis. Post FFT, each RU validates the IQ samples and assigns them appropriate PRB indexes. Each RU serving the corresponding donor base station is synchronized to the frame boundary used by the corresponding donor base station, for example, using a protocol specific preamble/pilot signal correlation process (for example, by correlating to known timing schemes). The resulting frequency-domain IQ samples are compressed if, and in the manner, indicated in the corresponding O-RAN control-plane messages. The resulting frequency-domain IQ samples for the 273 PRBs will be communicated in one or more O-RAN user-plane messages on a symbol-by-symbol basis (for example, using an appropriate O-RAN section extension) and communicated over the fronthaul to the master unit 130, 430 serving the donor base station (or possibly an ICN) in the symbol duration time with minimal latency. The O-RAN user-plane messages are communicated, for example, using the transport mode indicated in the corresponding O-RAN control-plane messages. The O-RAN user-plane messages can be communicated to other nodes of the DAS 100, 400 (for example, to an ICN 112, 412 or FHM that sums or combines user-plane data from multiple RUs). The master unit 130, 430 combines or sums uplink user-plane data received from the various remote units serving the corresponding donor base station and generates time-domain IQ samples from the combined frequency-domain IQ samples (for example, by performing an iFFT process), which are provided to the corresponding donor card (for example, the RFD donor card or CPRI digital donor card).

Management and synchronization data can be communicated to and from the nodes or components of the DAS 100, 400 using standard O-RAN management-plane and synchronization-plane messages. With this technique, standard O-RAN control-plane and user-plane messages are used even though the serving donor base station does not support the O-RAN fronthaul interface.

In an alternative embodiment, the user-plane data is communicated as time-domain IQ data. In such an embodiment, the O-RAN user-data is communicated using the provisions in the O-RAN standard for communicating IQ samples as time-domain IQ data. In such an embodiment, the time domain IQ data is packed according to the O-RAN standard. The RUs are informed (for example, via the O-RAN management-plane) that all PRBs are occupied via the user-plane.

Exemplary Embodiments

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

Example 1 includes a distributed antenna system (DAS), comprising: one of (a) a radio frequency (RF) donor configured to be communicatively coupled to a downlink antenna port of an RF interface base station, and (b) a digital donor configured to be communicatively coupled to a downlink antenna port of a baseband unit; a master timing entity configured to be synchronized with a time base of the RF interface base station or the baseband unit, and to provide a synchronized time base to components of the DAS used to determine slot related timing; and a plurality of remote units each of which is communicatively coupled to one of (a) the RF donor and (b) the digital donor, and each remote unit in a simulcast zone of the RF interface base station or the baseband unit is configured to (i) receive, for a slot, frequency-domain downlink baseband IQ data including only valid physical resource blocks (PRBs) which includes (p) control-plane data which identifies PRBs of the slot which contain valid PRBs and (q) corresponding user-plane data which contains baseband IQ data for the valid PRBs of the slot, (ii) using the frequency-domain downlink baseband IQ data including only the valid PRBs, generate downlink analog RF signals including only valid PRBs, and (iii) wirelessly transmit the downlink analog RF signals including only the valid PRBs; wherein DAS is configured to: receive a downlink base station signal or a stream of time-domain downlink baseband IQ data for the downlink antenna port of the RF interface base station or the baseband unit; using the downlink base station signal or the stream of the time-domain downlink baseband IQ data, generate time-domain downlink baseband IQ data for the downlink antenna port for the slot; using the time-domain downlink baseband IQ data for the slot, generate, for the slot, the frequency-domain downlink baseband IQ data; using the frequency-domain downlink baseband IQ data, for the slot, identify the valid PRBs and generate the control-plane data which identifies PRBs of the slot which contain the valid PRBs and the corresponding user-plane data which contain downlink baseband IQ data for the valid PRBs; and transmit frequency-domain downlink baseband IQ data for only the valid PRBs, including the control-plane data and the corresponding user-plane data, to each remote unit in the simulcast zone.

Example 2 includes the DAS of Example 1, further comprising a master unit comprising the master timing entity and configured to generate the frequency-domain downlink baseband IQ data, identify the valid PRBs and generate the control-plane data and the corresponding user-plane data, and transmit, to each remote unit in the simulcast zone, the frequency-domain downlink baseband IQ data for only the valid PRBs; wherein the master unit is configured to couple the one of (a) the RF donor and (b) the digital donor to the plurality of remote units and to: generate the time-domain downlink baseband IQ data for the slot; using the time-domain downlink baseband IQ data for the slot, generate, for the slot, the frequency-domain downlink baseband IQ data; using the frequency-domain downlink baseband IQ data, for the slot, identify the valid PRBs and generate the control-plane data which identifies PRBs of the slot which contain the valid PRBs and the corresponding user-plane data which contain the downlink baseband IQ data for the valid PRBs; and transmit the frequency-domain downlink baseband IQ data for only the valid PRBs, including the control-plane data and the corresponding user-plane data, to each remote unit in the simulcast zone.

Example 3 includes the DAS of any of Examples 1-2, wherein identify the valid PRBs comprises: determine a power level of each of at least one subcarrier of a PRB; determine whether a power level of one subcarrier or an aggregate power level of more than one subcarrier is greater than a downlink power threshold; and determine that the power level of one subcarrier or the aggregate power level of more than one subcarrier is greater than the downlink power threshold.

Example 4 includes the DAS of any of Examples 1-3, wherein the DAS is further configured to, upon generating the time-domain downlink baseband IQ data for the slot, then, immediately transmit a symbol of the slot, of the time-domain downlink baseband IQ data, to each remote unit of the DAS in the simulcast zone; and wherein the DAS is configured to only use the symbol of the slot to determine whether a PRB including the symbol is valid; wherein if the PRB is determined not to be valid, then no further data for the PRB is transmitted to each remote unit in the simulcast zone, and the symbol is discarded.

Example 5 includes the DAS of any of Examples 1-4, further comprising at least one of a switched Ethernet network and at least one intermediate combining node which communicatively couple the one of (a) the RF donor and (b) the digital donor to the plurality of remote units and through which the frequency-domain downlink baseband IQ data for only the valid PRBs, including the control-plane data and the corresponding user-plane data, is transmitted to each remote unit of the DAS in the simulcast zone of the RF interface base station or the baseband unit.

Example 6 includes a method of reducing downlink data transported in a distributed antenna system (DAS), the method comprising: receiving a downlink base station signal or a stream of time-domain downlink baseband IQ data for a downlink antenna port of a radio frequency (RF) interface base station or a baseband unit; using the downlink base station signal or the stream of time-domain downlink baseband IQ data, generating time-domain downlink baseband IQ data for the downlink antenna port for a slot; using the time-domain downlink baseband IQ data, generating, for a slot, frequency-domain downlink baseband IQ data; using the frequency-domain downlink baseband IQ data, of the slot, identifying valid physical resource blocks (PRBs) and generating control-plane data which identifies PRBs of the slot which contain the valid PRBs and a corresponding user-plane data which contain baseband IQ data for the valid PRBs; transmitting frequency-domain baseband IQ data for only the valid PRBs, including the control-plane data and the corresponding user-plane data, to each remote unit of the DAS in a simulcast zone of the RF interface base station or the baseband unit; using the frequency-domain downlink baseband IQ data including only the valid PRBs, generating, in each remote unit of the DAS in the simulcast zone, downlink analog RF signals including only the valid PRBs; and wirelessly transmitting, from each remote unit of the DAS in the simulcast zone, the downlink analog RF signals including only the valid PRBs.

Example 7 includes the method of Example 6, wherein identifying the valid PRBs comprises: determining a power level of each of at least one subcarrier of a PRB; determining whether a power level of one subcarrier or an aggregate power level of more than one subcarrier is greater than a downlink power threshold; and determining that the power level of one subcarrier or the aggregate power level of more than one subcarrier is greater than the downlink power threshold.

Example 8 includes the method of Example 6, further comprising upon generating the time-domain downlink baseband IQ data, then immediately transmitting time-domain downlink data for a symbol of the slot to each remote unit, of the DAS, in the simulcast zone; and wherein the DAS is configured to only use the symbol to determine with a PRB including the symbol is valid; wherein if the PRB is determined not to be valid, then no further data for the PRB is transmitted to each remote unit, of the DAS, in the simulcast zone, and the symbol is discarded.

Example 9 includes the method of Example 6, wherein transmitting the frequency-domain baseband IQ data for only the valid PRBs, including the control-plane data and the corresponding user-plane data, to each remote unit of the DAS in the simulcast zone of the RF interface base station or the baseband unit comprises transmitting the frequency-domain baseband IQ data through at least one of a switched Ethernet network and at least one intermediate combining node.

Example 10 includes a distributed antenna system (DAS) serving a base station, the distributed antenna system comprising: one of: (a) a radio frequency (RF) donor configured to be communicatively coupled to an uplink antenna port of an RF interface base station, and (b) a digital donor configured to be communicatively coupled to an uplink antenna port of a baseband unit; a master timing entity configured be synchronized with a time base of the one of: (a) the RF interface base station and (b) the baseband unit, and to provide a synchronized time base to components of the DAS used to determine slot related timing; and a plurality of remote units each of which is (x) communicatively coupled to each of the one of: (a) the RF donor and (b) the digital donor, wherein each remote unit in a simulcast zone of the RF interface base station or the baseband unit is configured to: wirelessly receive uplink analog RF signals for the uplink antenna port of the RF interface base station or the baseband unit; using the uplink analog RF signals, generate time-domain uplink baseband IQ data for a slot; using the time-domain uplink baseband IQ data for the slot, generate, for the slot, frequency-domain uplink baseband IQ data; using the frequency-domain uplink baseband IQ data for the slot, identify valid physical resource blocks (PRBs) and generate control-plane data which identifies PRBs of the slot which contain valid PRBs and corresponding user-plane data which contain uplink baseband IQ data for the valid PRBs; transmit frequency-domain uplink baseband IQ data for only the valid PRBs including the control-plane data and the corresponding user-plane data; wherein the DAS is configured to: receive the frequency-domain uplink baseband IQ data for only the valid PRBs including the control-plane data and the corresponding user-plane data; using the frequency-domain uplink baseband IQ data for only the valid PRBs, generate single combined base station signal or a stream of the uplink time-domain baseband IQ data; and transmit the single combined base station signal or the stream of the uplink time-domain uplink baseband IQ data to the uplink antenna port of the RF interface base station or the baseband unit.

Example 11 includes the DAS of Example 10, further comprising a master unit comprising the master timing entity; wherein the master unit is configured to couple the one of (a) the RF donor and (b) the digital donor to the plurality of remote units and to: receive the frequency-domain uplink baseband IQ data for only the valid PRBs including the control-plane data and the corresponding user-plane data; using the frequency-domain uplink baseband IQ data for only the valid PRBs, generate the single combined base station signal or a stream of time-domain baseband IQ data for the uplink antenna port of the RF interface base station or the baseband unit; and transmit the single combined base station signal or the stream of time-domain uplink baseband IQ data to the uplink antenna port of the RF interface base station or the baseband unit.

Example 12 includes the DAS of any of Examples 10-11, wherein identify the valid PRBs comprises: determine a power level of each of at least one subcarrier of a PRB; determine whether a power level of one subcarrier or an aggregate power level of more than one subcarrier is greater than an uplink power threshold; and determine that the power level of one subcarrier or the aggregate power level of more than one subcarrier is greater than the uplink power threshold.

Example 13 includes the DAS of any of Examples 10-12, wherein each remote unit in the simulcast zone of the RF interface base station or the baseband unit is further configured to, upon generating the time-domain uplink baseband IQ data for the slot, then, immediately transmit a symbol of the slot, of the time-domain uplink baseband IQ data, to another component of the DAS; and wherein the other component of the DAS is configured to only use the symbol of the slot to determine whether a PRB including the symbol and of the slot is valid; wherein if the PRB is determined not to be valid, then no further data for the PRB is transmitted to the other component of the DAS, and the symbol is discarded.

Example 14 includes the DAS of any of Examples 10-13, further comprising at least one of a switched Ethernet network and at least one intermediate combining node which communicatively couple the one of (a) the RF donor and (b) the digital donor to the plurality of remote units and through which the frequency-domain uplink baseband IQ data for only the valid PRBs, including the control-plane data and the corresponding user-plane data, is transmitted from each remote unit of the DAS in the simulcast zone of the RF interface base station or the baseband unit.

Example 15 includes a method of reducing uplink data transported in a distributed antenna system (DAS), the method comprising: wirelessly receiving, at each remote unit of the DAS in a simulcast zone of a radio frequency (RF) interface base station or a baseband unit, uplink analog RF signals for an uplink antenna port of an RF interface base station or a base band unit; using the uplink analog RF signals, generating time-domain uplink baseband IQ data for a slot; using the time-domain uplink baseband IQ data for the slot, generate, for the slot, frequency-domain uplink baseband IQ data; using the frequency-domain uplink baseband IQ data for the slot, identifying valid physical resource blocks (PRBs) and generating control-plane data which identifies PRBs of the slot which contain the valid PRBs and corresponding user-plane data which contain uplink baseband IQ data for the valid PRBs; transmitting the frequency-domain uplink baseband IQ data for only the valid PRBs, including the control-plane data and the corresponding user-plane data, to another component of the DAS; using the frequency-domain uplink baseband IQ data for only the valid PRBs, generating a single combined base station uplink signal stream or a stream of the time-domain uplink baseband IQ data; and transmitting the single combined base station uplink signal stream or the stream of the time-domain uplink baseband IQ data to the uplink antenna port of the RF interface base station or the baseband unit.

Example 16 includes the method of Example 15, wherein identifying the valid PRBs comprises: determining a power level of each of at least one subcarrier of a PRB; determining whether a power level of one subcarrier or an aggregate power level of more than one subcarrier is greater than an uplink power threshold; and determining that the power level of one subcarrier or the aggregate power level of more than one subcarrier is greater than the uplink power threshold.

Example 17 includes the method of any of Examples 15-16, further comprising upon generating the time-domain uplink baseband IQ data, then immediately transmitting time-domain uplink data for a symbol of the slot to each remote unit, of the DAS, in the simulcast zone; and wherein the DAS is configured to only use the symbol to determine whether a PRB including the symbol is valid; wherein if the PRB is determined not to be valid, then no further data for the PRB is transmitted to each remote unit, of the DAS, in the simulcast zone, and the symbol is discarded.

Example 18 includes the method of any of Examples 15-17, wherein transmitting the frequency-domain uplink baseband IQ data for only the valid PRBs, including the control-plane data and the corresponding user-plane data, to the other component of the DAS comprises transmitting the frequency-domain uplink baseband IQ data through at least one of a switched Ethernet network and at least one intermediate combining node.

Example 19 includes a distributed antenna system (DAS) serving a donor base station, the distributed antenna system comprising: a donor interface circuit configured to couple the donor base station to the DAS and to communicate analog radio frequency (RF) signals or time-domain digital data between the donor base station and the donor interface circuit; and a plurality of radio units (RUs) coupled to the donor interface circuit through an Ethernet network; wherein the DAS is configured to: receive downlink RF analog signals or downlink time-domain digital data including downlink in-phase and quadrature phase (IQ) data from a donor base station at the donor interface circuit, and therefrom produce the downlink time-domain digital data including the downlink IQ data at baseband; convert downlink time-domain baseband digital data into downlink frequency-domain baseband digital data including the downlink IQ data; identify downlink physical resource blocks (PRBs), for each slot of the downlink frequency-domain baseband digital data, having a valid signal and which include downlink IQ data from the donor base station, wherein the valid signal means a PRB or portion thereof satisfies predetermined one or more criterion; create, for each slot, at least one downlink open radio access network (O-RAN) user-plane message, comprising frequency-domain baseband IQ data including only the downlink PRBs of a slot having a valid received signal and including the downlink IQ data, and at least one corresponding downlink O-RAN control-plane message; and transmit, for each slot, the at least one downlink O-RAN user-plane message, comprising the frequency-domain baseband IQ data, and the at least one corresponding downlink O-RAN control-plane message; wherein each RU, of at least one RU, in a simulcast zone of the donor base station is configured to: receive the at least one downlink O-RAN user-plane message comprising downlink IQ data generated by the donor base station and the at least one corresponding downlink O-RAN control-plane message; using received O-RAN downlink user- and control-plane messages, produce a set of downlink RF analog signals including the downlink IQ data; and wirelessly transmit, to one or more user equipment, the set of downlink RF analog signals including the downlink IQ data.

Example 20 includes the DAS of Example 19, further comprising a master unit (MU) communicatively coupled between the donor interface circuit and the plurality of RUs; wherein the MU is configured to perform one or more of: produce the downlink time-domain digital data from RF downlink signals; convert the downlink time-domain baseband digital data into the downlink frequency-domain baseband digital data; identify the downlink PRBs having the valid signal and which include the downlink IQ data from the donor base station; create, for each slot, the at least one downlink O-RAN user-plane message and the at least one corresponding downlink control-plane message; and transmit, for each slot, the at least one downlink O-RAN user-plane message, and the at least one corresponding downlink O-RAN control-plane message.

Example 21 includes the DAS of Example 20, further comprising an intermediate combining node (ICN) communicatively coupled between at least one RU and the MU.

Example 22 includes the DAS of any of Examples 19-21, wherein the donor interface circuit comprises a radio frequency (RF) donor interface configured to be coupled to the donor base station via an analog RF interface.

Example 23 includes the DAS of any of Examples 19-22, wherein the donor interface circuit comprises a CPRI digital donor card configured to be coupled to the donor base station via a CPRI digital fronthaul interface.

Example 24 includes the DAS of any of Examples 19-23, further comprising an O-RAN donor interface circuit configured to couple an O-RAN distributed unit to the DAS and to communicate downlink O-RAN user-plane messages, and downlink O-RAN control-plane messages that correspond to the downlink O-RAN user-plane messages, therebetween.

Example 25 includes the DAS of any of Examples 19-24, wherein the Ethernet network is a switched Ethernet network.

Example 26 includes a method for translating time-domain data into open radio access network (O-RAN) messages in a distributed antenna system (DAS), the method comprising: receiving downlink RF analog signals or downlink time-domain digital data including downlink in-phase and quadrature phase (IQ) data from a donor base station, and therefrom produce the downlink time-domain digital data; converting the downlink time-domain digital data into downlink frequency-domain data; identifying downlink physical resource blocks (PRBs) for each slot having a valid signal and which include downlink IQ data from the donor base station, wherein the valid signal means a PRB or portion thereof satisfies predetermined one or more criterion; creating, for each slot, at least one downlink open radio access network (O-RAN) user-plane message, comprising frequency-domain baseband IQ data including only the downlink PRBs of a slot having a valid received signal and including the downlink IQ data, and at least one corresponding downlink O-RAN control-plane message; transmitting, for each slot, the at least one downlink O-RAN user-plane message, comprising the frequency-domain baseband IQ data, and the at least one corresponding downlink O-RAN control-plane message; receiving at each radio unit (RU) in a simulcast zone of the donor base station the at least one downlink O-RAN user-plane message comprising downlink IQ data generated by the donor base station and the at least corresponding one downlink O-RAN control-plane message; using received downlink O-RAN user- and control-plane messages, producing, at each RU in the simulcast zone of the donor base station, a set of downlink RF analog signals including the downlink IQ data; and wirelessly transmitting, from each RU in the simulcast zone of the donor base station and to one or more user equipment, the set of downlink RF analog signals including the downlink IQ data.

Example 27 includes a distributed antenna system (DAS) serving a donor base station, the distributed antenna system comprising: a donor interface circuit configured to couple the donor base station to the DAS and to communicate analog radio frequency (RF) signals or time-domain digital data between the donor base station and the donor interface circuit; and a plurality of radio units (RUs) coupled to the donor interface circuit through an Ethernet network; wherein each RU, of at least one RU, in a simulcast zone of the donor base station is configured to: wirelessly receive, from one or more user equipment, a set of uplink RF analog signals including uplink in-phase and quadrature phase (IQ) data; using the set of uplink RF analog signals including the uplink IQ data, generate uplink frequency-domain IQ data at baseband; identify uplink physical resource blocks (PRBs) having a valid signal and which include the uplink IQ data from the one or more user equipment; and create and then transmit, towards the donor interface circuit, at least one O-RAN uplink user-plane message including only uplink PRBs for each slot having a valid received signal and including the uplink IQ data and at least one corresponding O-RAN uplink control-plane message; wherein the DAS is configured to: receive the at least one O-RAN uplink user-plane message comprising uplink IQ data and the at least one corresponding O-RAN uplink control-plane message; using the received messages, generate at least one combined uplink O-RAN user-plane message for each slot; determine whether a component of the DAS, combining uplink O-RAN user-plane messages for each slot, is a last component, of the DAS in a path to the donor interface circuit, performing combining of uplink user-plane messages; determining that the component of the DAS performing the combining is the last component performing combining of uplink user-plane messages, then, convert, for each slot, combined frequency-domain IQ data into combined time-domain IQ data; using the combined time-domain IQ data, produce a single set of uplink time-domain base station signals or data; and transmit the signals or data including the combined uplink time-domain IQ data to a donor base station.

Example 28 includes the DAS of Example 27, further comprising a master unit (MU) communicatively coupled between the donor interface circuit and the plurality of RUs; wherein the MU is configured to perform one or more of: using the received messages, generate the at least one combined uplink O-RAN user-plane message for each slot; determine whether the component of the DAS, combining the uplink O-RAN user-plane messages for each slot, is the last component, of the DAS in the path to the donor interface circuit performing, combining of uplink user-plane messages; and determining that the component of the DAS performing the combining is the last component performing combining of uplink user-plane messages, then, convert, for each slot, the combined frequency-domain IQ data into combined time-domain IQ data.

Example 29 includes the DAS of Example 28, further comprising an intermediate combining node (ICN) communicatively coupled between at least one RU and the MU.

Example 30 includes the DAS of any of Examples 27-29, wherein the donor interface circuit comprises a radio frequency (RF) donor interface configured to be coupled to a donor base station via an analog RF interface.

Example 31 includes the DAS of any of Examples 27-30, wherein the donor interface circuit comprises a CPRI digital donor card configured to be coupled to a baseband unit via a CPRI digital fronthaul interface.

Example 32 includes the DAS of any of Examples 27-31, further comprising an O-RAN donor interface circuit configured to couple an O-RAN distributed unit to the DAS and to communicate O-RAN user-plane messages, and O-RAN control-plane messages each of which corresponds to one of the O-RAN user-plane messages, therebetween.

Example 33 includes a method for translating open radio access network (O-RAN) messages into time-domain data in a distributed antenna system (DAS), the method comprising: wirelessly receiving, from one or more user equipment, a set of uplink RF analog signals including uplink in-phase and quadrature phase (IQ) data; using the set of uplink RF analog signals including the uplink IQ data, generating uplink frequency-domain IQ data at baseband; identifying uplink physical resource blocks (PRBs) having a valid signal and which include the uplink IQ data from the one or more user equipment; creating and then transmitting, towards a donor interface circuit, at least one O-RAN uplink user-plane message including only uplink PRBs for each slot having a valid received signal and including the uplink IQ data and at least one corresponding O-RAN uplink control-plane message; receiving the at least one O-RAN uplink user-plane message comprising uplink IQ data and the at least one corresponding O-RAN uplink control-plane message; using received messages, generating at least one combined uplink user-plane message for each slot; determining whether a component of the DAS, combining uplink O-RAN user-plane messages for each slot, is a last component, of the DAS in a path to the donor interface circuit, performing combining of uplink user-plane messages; determining that the component of the DAS performing the combining is the last component performing combining of uplink user-plane messages, then, converting, for each slot, combined uplink frequency-domain IQ data into combined uplink time-domain IQ data; and transmitting signals or data including the combined uplink time-domain IQ data to a donor base station.

The invention claimed is:

1. A distributed antenna system (DAS), comprising:
one of (a) a radio frequency (RF) donor configured to be communicatively coupled to a downlink antenna port of an RF interface base station, and (b) a digital donor configured to be communicatively coupled to a downlink antenna port of a baseband unit;
a master timing entity configured to be synchronized with a time base of the RF interface base station or the baseband unit, and to provide a synchronized time base to components of the DAS used to determine slot related timing; and
a plurality of remote units each of which is communicatively coupled to one of (a) the RF donor and (b) the digital donor, and each remote unit in a simulcast zone of the RF interface base station or the baseband unit is configured to (i) receive, for a slot, frequency-domain downlink baseband IQ data including only valid physical resource blocks (PRBs) which includes (p) control-plane data which identifies PRBs of the slot which contain valid PRBs and (q) corresponding user-plane data which contains baseband IQ data for the valid PRBs of the slot, (ii) using the frequency-domain downlink baseband IQ data including only the valid PRBs, generate downlink analog RF signals including only valid PRBs, and (iii) wirelessly transmit the downlink analog RF signals including only the valid PRBs;
wherein DAS is configured to:
receive a downlink base station signal or a stream of time-domain downlink baseband IQ data for the downlink antenna port of the RF interface base station or the baseband unit;
using the downlink base station signal or the stream of the time-domain downlink baseband IQ data, generate time-domain downlink baseband IQ data for the downlink antenna port for the slot;
using the time-domain downlink baseband IQ data for the slot, generate, for the slot, the frequency-domain downlink baseband IQ data;
using the frequency-domain downlink baseband IQ data, for the slot, identify the valid PRBs and generate the control-plane data which identifies PRBs of the slot which contain the valid PRBs and the corresponding user-plane data which contain downlink baseband IQ data for the valid PRBs; and
transmit frequency-domain downlink baseband IQ data for only the valid PRBs, including the control-plane data and the corresponding user-plane data, to each remote unit in the simulcast zone.

2. The DAS of claim 1, further comprising a master unit comprising the master timing entity and configured to generate the frequency-domain downlink baseband IQ data, identify the valid PRBs and generate the control-plane data and the corresponding user-plane data, and transmit, to each remote unit in the simulcast zone, the frequency-domain downlink baseband IQ data for only the valid PRBs;
wherein the master unit is configured to couple the one of (a) the RF donor and (b) the digital donor to the plurality of remote units and to:
generate the time-domain downlink baseband IQ data for the slot;
using the time-domain downlink baseband IQ data for the slot, generate, for the slot, the frequency-domain downlink baseband IQ data;
using the frequency-domain downlink baseband IQ data, for the slot, identify the valid PRBs and generate the control-plane data which identifies PRBs of the slot which contain the valid PRBs and the corresponding user-plane data which contain the downlink baseband IQ data for the valid PRBs; and
transmit the frequency-domain downlink baseband IQ data for only the valid PRBs, including the control-plane data and the corresponding user-plane data, to each remote unit in the simulcast zone.

3. The DAS of claim 1, wherein identify the valid PRBs comprises:
determine a power level of each of at least one subcarrier of a PRB;
determine whether a power level of one subcarrier or an aggregate power level of more than one subcarrier is greater than a downlink power threshold; and
determine that the power level of one subcarrier or the aggregate power level of more than one subcarrier is greater than the downlink power threshold.

4. The DAS of claim 1, wherein the DAS is further configured to, upon generating the time-domain downlink baseband IQ data for the slot, then, immediately transmit a symbol of the slot, of the time-domain downlink baseband IQ data, to each remote unit of the DAS in the simulcast zone; and
wherein the DAS is configured to only use the symbol of the slot to determine whether a PRB including the symbol is valid;
wherein if the PRB is determined not to be valid, then no further data for the PRB is transmitted to each remote unit in the simulcast zone, and the symbol is discarded.

5. The DAS of claim 1, further comprising at least one of a switched Ethernet network and at least one intermediate combining node which communicatively couple the one of (a) the RF donor and (b) the digital donor to the plurality of remote units and through which the frequency-domain downlink baseband IQ data for only the valid PRBs, including the control-plane data and the corresponding user-plane data, is transmitted to each remote unit of the DAS in the simulcast zone of the RF interface base station or the baseband unit.

6. A method of reducing downlink data transported in a distributed antenna system (DAS), the method comprising:
receiving a downlink base station signal or a stream of time-domain downlink baseband IQ data for a downlink antenna port of a radio frequency (RF) interface base station or a baseband unit;
using the downlink base station signal or the stream of time-domain downlink baseband IQ data, generating time-domain downlink baseband IQ data for the downlink antenna port for a slot;
using the time-domain downlink baseband IQ data, generating, for a slot, frequency-domain downlink baseband IQ data;
using the frequency-domain downlink baseband IQ data, of the slot, identifying valid physical resource blocks (PRBs) and generating control-plane data which identifies PRBs of the slot which contain the valid PRBs and a corresponding user-plane data which contain baseband IQ data for the valid PRBs;
transmitting frequency-domain baseband IQ data for only the valid PRBs, including the control-plane data and the corresponding user-plane data, to each remote unit of the DAS in a simulcast zone of the RF interface base station or the baseband unit;
using the frequency-domain downlink baseband IQ data including only the valid PRBs, generating, in each remote unit of the DAS in the simulcast zone, downlink analog RF signals including only the valid PRBs; and
wirelessly transmitting, from each remote unit of the DAS in the simulcast zone, the downlink analog RF signals including only the valid PRBs.

7. The method of claim 6, wherein identifying the valid PRBs comprises:
determining a power level of each of at least one subcarrier of a PRB;
determining whether a power level of one subcarrier or an aggregate power level of more than one subcarrier is greater than a downlink power threshold; and
determining that the power level of one subcarrier or the aggregate power level of more than one subcarrier is greater than the downlink power threshold.

8. The method of claim 6, further comprising upon generating the time-domain downlink baseband IQ data, then immediately transmitting time-domain downlink data for a symbol of the slot to each remote unit, of the DAS, in the simulcast zone; and
wherein the DAS is configured to only use the symbol to determine with a PRB including the symbol is valid;

wherein if the PRB is determined not to be valid, then no further data for the PRB is transmitted to each remote unit, of the DAS, in the simulcast zone, and the symbol is discarded.

9. The method of claim 6, wherein transmitting the frequency-domain baseband IQ data for only the valid PRBs, including the control-plane data and the corresponding user-plane data, to each remote unit of the DAS in the simulcast zone of the RF interface base station or the baseband unit comprises transmitting the frequency-domain baseband IQ data through at least one of a switched Ethernet network and at least one intermediate combining node.

10. A distributed antenna system (DAS) serving a base station, the distributed antenna system comprising:
one of: (a) a radio frequency (RF) donor configured to be communicatively coupled to an uplink antenna port of an RF interface base station, and (b) a digital donor configured to be communicatively coupled to an uplink antenna port of a baseband unit;
a master timing entity configured be synchronized with a time base of the one of: (a) the RF interface base station and (b) the baseband unit, and to provide a synchronized time base to components of the DAS used to determine slot related timing; and
a plurality of remote units each of which is (x) communicatively coupled to each of the one of: (a) the RF donor and (b) the digital donor, wherein each remote unit in a simulcast zone of the RF interface base station or the baseband unit is configured to:
wirelessly receive uplink analog RF signals for the uplink antenna port of the RF interface base station or the baseband unit;
using the uplink analog RF signals, generate time-domain uplink baseband IQ data for a slot;
using the time-domain uplink baseband IQ data for the slot, generate, for the slot, frequency-domain uplink baseband IQ data;
using the frequency-domain uplink baseband IQ data for the slot, identify valid physical resource blocks (PRBs) and generate control-plane data which identifies PRBs of the slot which contain valid PRBs and corresponding user-plane data which contain uplink baseband IQ data for the valid PRBs;
transmit frequency-domain uplink baseband IQ data for only the valid PRBs including the control-plane data and the corresponding user-plane data;
wherein the DAS is configured to:
receive the frequency-domain uplink baseband IQ data for only the valid PRBs including the control-plane data and the corresponding user-plane data;
using the frequency-domain uplink baseband IQ data for only the valid PRBs, generate single combined base station signal or a stream of the uplink time-domain baseband IQ data; and
transmit the single combined base station signal or the stream of the uplink time-domain uplink baseband IQ data to the uplink antenna port of the RF interface base station or the baseband unit.

11. The DAS of claim 10, further comprising a master unit comprising the master timing entity;
wherein the master unit is configured to couple the one of (a) the RF donor and (b) the digital donor to the plurality of remote units and to:
receive the frequency-domain uplink baseband IQ data for only the valid PRBs including the control-plane data and the corresponding user-plane data;
using the frequency-domain uplink baseband IQ data for only the valid PRBs, generate the single combined base station signal or a stream of time-domain baseband IQ data for the uplink antenna port of the RF interface base station or the baseband unit; and
transmit the single combined base station signal or the stream of time-domain uplink baseband IQ data to the uplink antenna port of the RF interface base station or the baseband unit.

12. The DAS of claim 10, wherein identify the valid PRBs comprises:
determine a power level of each of at least one subcarrier of a PRB;
determine whether a power level of one subcarrier or an aggregate power level of more than one subcarrier is greater than an uplink power threshold; and
determine that the power level of one subcarrier or the aggregate power level of more than one subcarrier is greater than the uplink power threshold.

13. The DAS of claim 10, wherein each remote unit in the simulcast zone of the RF interface base station or the baseband unit is further configured to, upon generating the time-domain uplink baseband IQ data for the slot, then, immediately transmit a symbol of the slot, of the time-domain uplink baseband IQ data, to another component of the DAS; and
wherein the other component of the DAS is configured to only use the symbol of the slot to determine whether a PRB including the symbol and of the slot is valid;
wherein if the PRB is determined not to be valid, then no further data for the PRB is transmitted to the other component of the DAS, and the symbol is discarded.

14. The DAS of claim 10, further comprising at least one of a switched Ethernet network and at least one intermediate combining node which communicatively couple the one of (a) the RF donor and (b) the digital donor to the plurality of remote units and through which the frequency-domain uplink baseband IQ data for only the valid PRBs, including the control-plane data and the corresponding user-plane data, is transmitted from each remote unit of the DAS in the simulcast zone of the RF interface base station or the baseband unit.

15. A method of reducing uplink data transported in a distributed antenna system (DAS), the method comprising:
wirelessly receiving, at each remote unit of the DAS in a simulcast zone of a radio frequency (RF) interface base station or a baseband unit, uplink analog RF signals for an uplink antenna port of an RF interface base station or a base band unit;
using the uplink analog RF signals, generating time-domain uplink baseband IQ data for a slot;
using the time-domain uplink baseband IQ data for the slot, generate, for the slot, frequency-domain uplink baseband IQ data;
using the frequency-domain uplink baseband IQ data for the slot, identifying valid physical resource blocks (PRBs) and generating control-plane data which identifies PRBs of the slot which contain the valid PRBs and corresponding user-plane data which contain uplink baseband IQ data for the valid PRBs;
transmitting the frequency-domain uplink baseband IQ data for only the valid PRBs, including the control-plane data and the corresponding user-plane data, to another component of the DAS;
using the frequency-domain uplink baseband IQ data for only the valid PRBs, generating a single combined base station uplink signal stream or a stream of the time-domain uplink baseband IQ data; and transmitting the single combined base station uplink signal stream or the stream of the time-domain uplink baseband IQ data to the uplink antenna port of the RF interface base station or the baseband unit.

16. The method of claim 15, wherein identifying the valid PRBs comprises:

determining a power level of each of at least one subcarrier of a PRB;

determining whether a power level of one subcarrier or an aggregate power level of more than one subcarrier is greater than an uplink power threshold; and determining that the power level of one subcarrier or the aggregate power level of more than one subcarrier is greater than the uplink power threshold.

17. The method of claim 15, further comprising upon generating the time-domain uplink baseband IQ data, then immediately transmitting time-domain uplink data for a symbol of the slot to each remote unit, of the DAS, in the simulcast zone; and wherein the DAS is configured to only use the symbol to determine whether a PRB including the symbol is valid;

wherein if the PRB is determined not to be valid, then no further data for the PRB is transmitted to each remote unit, of the DAS, in the simulcast zone, and the symbol is discarded.

18. The method of claim 15, wherein transmitting the frequency-domain uplink baseband IQ data for only the valid PRBs, including the control-plane data and the corresponding user-plane data, to the other component of the DAS comprises transmitting the frequency-domain uplink baseband IQ data through at least one of a switched Ethernet network and at least one intermediate combining node.

* * * * *